(12) United States Patent
Huang et al.

(10) Patent No.: US 11,403,412 B2
(45) Date of Patent: Aug. 2, 2022

(54) ACCESSING ENCRYPTED USER DATA AT A MULTI-TENANT HOSTED CLOUD SERVICE

(71) Applicant: Citrix Systems, Inc., Fort Lauderdale, FL (US)

(72) Inventors: Feng Huang, Girton (GB); Duncan Gabriel, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 535 days.

(21) Appl. No.: 16/273,484

(22) Filed: Feb. 12, 2019

(65) Prior Publication Data

US 2020/0257815 A1    Aug. 13, 2020

(51) Int. Cl.
| | |
|---|---|
| *G06F 21/62* | (2013.01) |
| *G06F 9/50* | (2006.01) |
| *G06F 21/33* | (2013.01) |
| *G06F 21/60* | (2013.01) |
| *H04L 9/08* | (2006.01) |
| *H04L 9/40* | (2022.01) |

(52) U.S. Cl.
CPC ........ *G06F 21/6218* (2013.01); *G06F 9/5072* (2013.01); *G06F 21/335* (2013.01); *G06F 21/602* (2013.01); *H04L 9/0861* (2013.01); *H04L 63/102* (2013.01); *G06F 2221/2103* (2013.01); *G06F 2221/2117* (2013.01)

(58) Field of Classification Search
CPC ................................................. G06F 21/6218
See application file for complete search history.

(56) References Cited

U.S. PATENT DOCUMENTS

| | | | |
|---|---|---|---|
| 9,396,341 B1 | 7/2016 | Chandra et al. | |
| 9,699,167 B1* | 7/2017 | Tovino | H04L 63/10 |
| 9,813,303 B1* | 11/2017 | Guigli | H04L 63/0807 |
| 2014/0044259 A1* | 2/2014 | Funayama | G06F 21/602 |
| | | | 380/243 |
| 2017/0339156 A1 | 11/2017 | Gupta et al. | |

OTHER PUBLICATIONS

Extended European Search Report for EP Appl. No. 20155312.0, dated Mar. 30, 2020.
Examination Report on EP Appl. No. 20155312.0 dated Aug. 10, 2021.

* cited by examiner

*Primary Examiner* — Simon P Kanaan
(74) *Attorney, Agent, or Firm* — Foley & Lardner LLP

(57) ABSTRACT

Systems and methods described herein provide access to encrypted user data at a multi-tenant hosted cloud service. The cloud service enrolls a first tenant in the cloud service. The cloud service receives a request for a ticket for a user of the first tenant to access the cloud service. The cloud service communicates a user data access ticket for the user to access a user data service of the cloud service. The cloud service receives a request to store user data of the user. The request includes encrypted user data. The cloud service stores the encrypted user data. The cloud service may provide the encrypted user data to a computing device of the user after validating the user data access ticket received from the computing device. The computing device may decrypt the encrypted user data and identify the data of the user for resources provided by server(s).

25 Claims, 12 Drawing Sheets

ACCESSING ENCRYPTED USER DATA AT A MULTI-TENANT HOSTED CLOUD SERVICE

FIELD OF THE DISCLOSURE

The present application generally relates to storage and delivery of user data, such as user preferences data.

BACKGROUND

Computing devices or systems can execute a workflow to perform one or more processing tasks. However, due to the increasing complexity of such workflows, technical challenges arise in efficiently and securely storing and delivering user data among a plurality of computing devices without increased processor, memory, or bandwidth utilization.

BRIEF SUMMARY

The present disclosure is directed towards systems and methods for accessing encrypted user preferences data (and other user data) at a multi-tenant hosted user data service. The present disclosure describes a cloud-hosted service (also referred to herein as "cloud services") which is configured to store user data. In some embodiments, the cloud services may store the user data on a server. The user data may be stored by the cloud services for on-premises deployment (for instance, by an enterprise application store such as Citrix StoreFront by Citrix Systems, Inc. of Fort Lauderdale, Fla.). The user data stored in and/or by the cloud services may be encrypted. In some implementations, the cloud services may not include or possess the encryption key and, as such, cannot decrypt the user data. Such embodiments reduce the complexity of the systems and methods described herein.

Various enterprise application stores, such as Citrix StoreFront, are configured to provide users access to hosted resources, such as hosted applications or desktops. Such hosted resources may be provided to the user through a web browser, native receiver application, and so forth. A number of servers can form a server group to provide high-availability of hosted resources for a geographic location. A global organization or enterprise may deploy several server groups (e.g., one for each geographic location) to serve the global enterprise's user base.

In such environments, it may be desirable to maintain each user's data, such as favorite resources, user settings for their favorite resources, and so forth. In implementations which do not include some of the systems and methods described herein, the user data may be stored in a file database for the enterprise application store's server. The user data are then replicated among each of the servers in a service group. In some implementations, the user data may be replicated using Microsoft Peer Mesh technology. Recently, Microsoft Peer mesh technology has become depreciated, and enterprises are finding that setting up cross-group data synchronization can be cumbersome and unreliable.

The present disclosure provides a solution to the problems identified in the prior art by offloading storage of user data to cloud services while maintaining the security of the user data at the cloud services. For instance, the present disclosure describes providing a cloud service that is hosted in a public cloud (such as the Citrix cloud). User data is encrypted prior to sending the user data to the public cloud. The user data is stored in a globally available cloud-hosted database, such as Azure CosmosDB. The encryption key for decrypting the encrypted user data is securely stored, for instance, in the enterprise's on-premises active directory. Users, such as employees of an enterprise (for instance, a tenant) can retrieve the encrypted user data by providing a ticket which requests the encrypted user data. The user's identity is confirmed, and the encrypted user data is transmitted to the user. The embodiments described herein reduce the complexity of on-premises resource storage and deployment by offloading the encrypted user data to cloud services. The embodiments described herein securely store user data, as the cloud services stores the encrypted user data without the decryption key. Such embodiments ensure that the user data is secure against inadvertent or malicious interception.

Prior to storing user data, an on-premises server of a tenant enrolls with the cloud services. In some embodiments, an administrator operating a user interface for a device can present proof of entitlement to access cloud services, such as licensing. Upon successful enrollment of the tenant, the cloud services may issue a tenant service key and endpoint information to the tenant. The tenant service key and endpoint information may be used by the tenant for accessing the cloud services.

The server of the tenant may act as a receiver for various clients or client devices. Prior to the clients reading or writing the user data, the clients may obtain a ticket (also referred to herein as "User data access ticket"). To obtain the user data access ticket, the server of the tenant may receive a request from the client. The server of the tenant may generate an encryption key for the user and store the encryption key in a tenant active directory (e.g., as a confidential attribute). The server may provide the user data access ticket to the client.

To store user data at the cloud services, the client may encrypt user data using the encryption key. The client may transmit a request to store user data to the server for the tenant, which may in turn be transmitted to the cloud services. The request may include the user data access ticket and the encrypted user data. The cloud services may validate the user data access ticket, and store the encrypted user data (e.g., at cloud services, at a server communicably coupled to the cloud services, and so forth). The client may subsequently retrieve the encrypted user data in a similar request to the tenant, which is routed to the cloud services. The cloud services may validate the user data access ticket and transmit the encrypted user data to the client.

In some implementations, the server and/or client may rotate the encryption key. In such implementations, the server and/or client may fetch the encrypted user data from the cloud services (e.g., as briefly outlined described above), decrypted using the old encryption key, re-encrypted using a new encryption key, and transmitted to the cloud services in a request to store user data. In some implementations, rather than routing requests through a server of the tenant, the client may route requests directly to cloud services. Such implementations may reduce tenant server load. In some implementations, rather than the encryption key stored in an active directory at the tenant, the encryption key may be stored in a secure location by cloud services. While described herein as storing user data, it should be understood that the present disclosure may be adapted to securely store any client data for on-premises services.

At least one aspect of the present technical solution is directed to a method for accessing encrypted user data at a multi-tenant hosted cloud service. The method includes communicating, by the cloud service responsive to enrollment by a first tenant of a plurality of tenants, a tenant service key and information on a service endpoint for the first tenant to a first server of the first tenant. The method includes receiving, by the cloud service from the first server, a first request for a ticket for a user of the first tenant to access the cloud service. The first request includes a user identifier of the user and the tenant service key of the first tenant. The method includes communicating, by the cloud service to the first server of the first tenant responsive to the first request, a user data access ticket for the user to access the user data service. The method includes receiving, by the cloud service, a second request to store user data of the user. The second request includes the user data access ticket and encrypted user data of the user. The method includes storing, by the cloud service responsive to validating the user data access ticket, the encrypted user data of the user associated with the user identifier and a tenant identifier corresponding to the tenant service key. The method includes providing, by the cloud service, the encrypted user data to a computing device of the user responsive to validating the user data access ticket received by the computing device of the user. The computing device is configured to decrypt the encrypted user data and use the user data of the user into resources provided by one or more servers.

In some embodiments, the method further includes storing, by the cloud service, the encrypted user data of the user to a storage indexed by the user identifier and the tenant identifier. In some embodiments, the method further includes receiving, by the cloud service from the computing device of the user of the first tenant, a third request to get the user data of the user at the cloud service. The third request may include the user data access ticket. In some embodiments, the method further includes accessing, by the cloud service responsive to validating the user data access ticket, the tenant identifier and the user identifier. In some embodiments, the method further includes communicating, by the cloud service to the computing device of the user, the encrypted user data of the user accessed from storage using the tenant identifier and the user identifier. In some embodiments, the method further includes communicating, by the cloud service, a challenge for enrollment information to a user interface of a device of the first tenant. The cloud service may enroll the first tenant in the cloud service responsive to a successful response to the challenge for enrollment information.

In some embodiments, the first server is configured to generate an encryption key for the user and store the encryption key as a confidential information in a user object for the user. In some embodiments, the first server is configured to provide a cloud service endpoint, the encryption key and the user data access ticket to the computing device of the user. In some embodiments, the encrypted user data of the user is encrypted with the encryption key provided by the first server. In some embodiments, the first server of the first tenant is a storefront server and the encrypted user data identifies the one or more data of the user for resources provided by the storefront server.

Another aspect of the present technical solution includes a system for accessing encrypted user data at a multi-tenant hosted cloud service. The system includes a cloud service. The cloud service is configured to communicate, responsive to enrollment by a first tenant of a plurality of tenants in the cloud service, a tenant service key and information on a service endpoint for the first tenant to a first server of the first tenant. The cloud service is configured to receive, from the first server, a first request for a ticket for a user of the first tenant to access the cloud service. The first request includes a user identifier of the user and the tenant service key of the first tenant. The cloud service is configured to communicate, to the first server of the first tenant responsive to the first request, a user data access ticket for the user to access the user data service. The cloud service is configured to receive a second request to store user data of the user. The second request includes the user data access ticket and encrypted user data of the user. The cloud service is configured to store, responsive to validating the user data access ticket, the encrypted user data of the user associated with the user identifier and a tenant identifier corresponding to the tenant service key. The cloud service is configured to provide the encrypted user data to a computing device of the user responsive to validating the user data access ticket received by the computing device of the user. The computing device is configured to decrypt the encrypted user data and use the user data of the user into resources provided by one or more servers.

In some embodiments, the cloud service is configured to store the encrypted user data of the user to a storage indexed by the user identifier and the tenant identifier. In some embodiments, the cloud service is configured to receive, from the computing device of the user of the first tenant, a third request to get one or more user data of the user at the cloud service. The third request may include the user data access ticket. In some embodiments, the cloud service is configured to access, responsive to the ticketing service validating the user data access ticket, the tenant identifier and the user identifier. In some embodiments, the cloud service is configured to communicate, to the computing device of the user, the encrypted user data of the user accessed from storage using the tenant identifier and the user identifier.

In some embodiments, the cloud service is configured to communicate a challenge for enrollment information to a user interface of a device of the first tenant, the cloud service enrolling the first tenant in the cloud service responsive to a successful response to the challenge for enrollment information. In some embodiments, the first server is configured to generate an encryption key for the user and stores the encryption key as a confidential information in a user object for the user. In some embodiments, the first server is configured to provide a cloud service endpoint, the encryption key and the user data access ticket to the computing device of the user. In some embodiments, the encrypted user data of the user is encrypted with the encryption key provided by the first server. In some embodiments, the first server of the first tenant is a storefront server and the encrypted user data identifies the one or more data of the user for resources provided by the storefront server.

Another aspect of the present technical solution includes a method for accessing a hosted resource. The method includes initiating, by a first tenant server of a first tenant, enrollment of the first tenant server with a multi-tenant cloud-hosted service. The method includes communicating, by the first tenant server to the multi-tenant cloud-hosted service, encrypted user data corresponding to a user of the first tenant. The encrypted user data includes user data for the user corresponding to a hosted resource. The method includes receiving, by the first tenant server, a request from a computing device operated by the user to access the hosted resource. The method includes receiving, by the first tenant server from the multi-tenant cloud-hosted service, the encrypted user data associated with the user. The method includes providing, by the first tenant server to the computing device operated by the user, the user data associated with the user. The computing device is configured to incorporate the user data into the hosted resource.

In some embodiments, the method further includes storing, by the first tenant server, an encryption key used for encrypting the encrypted user data. In some embodiments, the method further includes decrypting, by the first tenant server, the encrypted user data received from the multi-tenant cloud-hosted service. Providing the user data may include providing, by the first tenant server to the computing device operated by the user, the user data in decrypted form. The computing device may be configured to incorporate the decrypted user data into the hosted resource. In some embodiments, providing the user data includes providing, by the first tenant server to the computing device operated by the user, the user data in encrypted form and the encryption key. The computing device may be configured to decrypt the user data using the encryption key and incorporate the decrypted user data into the hosted resource. In some embodiments, the hosted resource is one of a hosted desktop or a hosted application.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
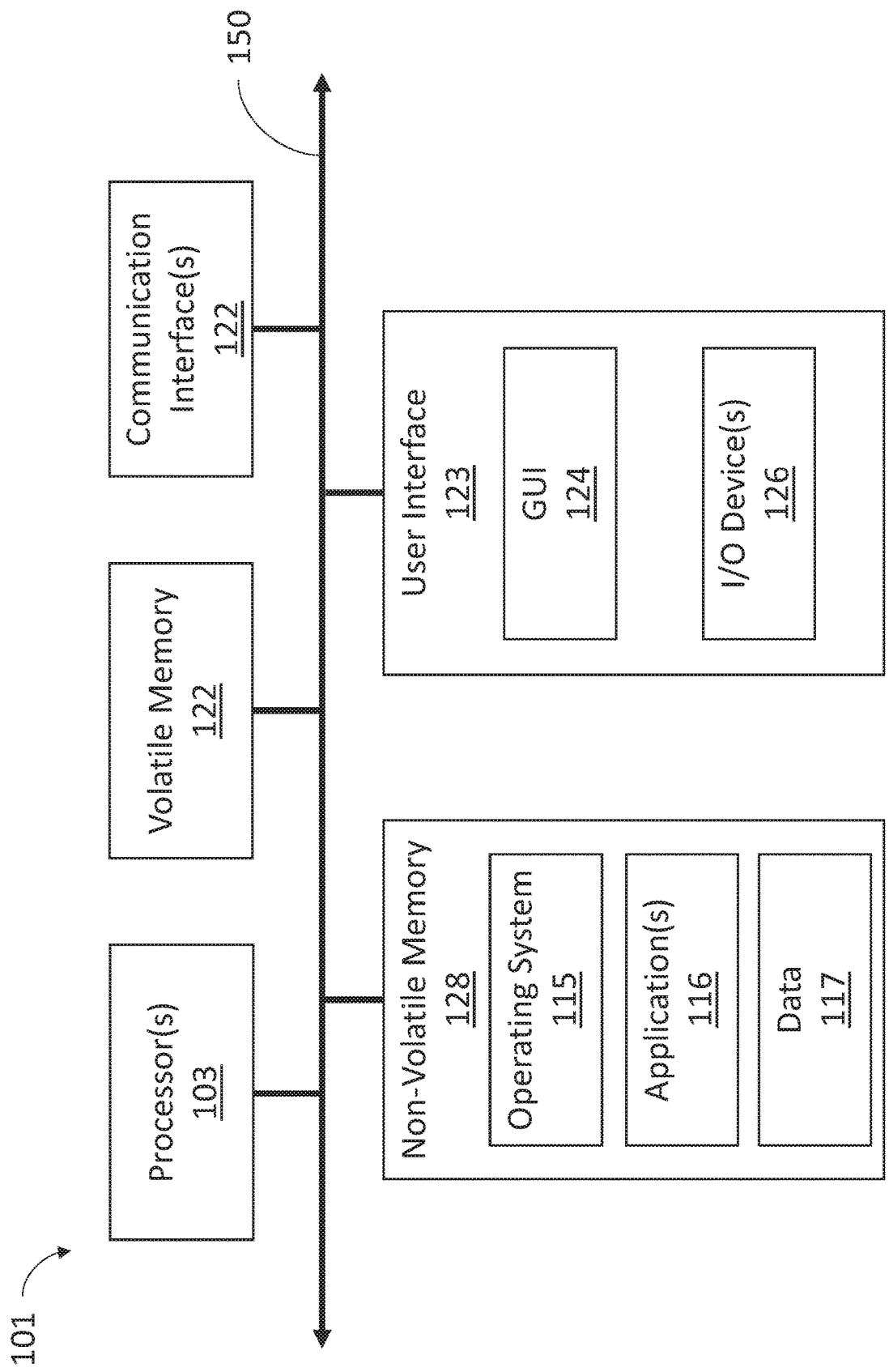
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for accessing encrypted user data at a multi-tenant hosted cloud service.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Accessing Encrypted User Data at a Multi-Tenant Hosted User Data Service The present disclosure is directed towards systems and methods for accessing encrypted user data at a multi-tenant hosted user data service. The present disclosure describes a cloud-hosted service (also referred to herein as "cloud services") which is configured to store user data. As used herein, the "cloud" is defined as implementations in which data, information, etc. is located remotely from a computing device which may access the data. As one example, data may be stored, located, executed, etc. on a cloud server which is owned and/or controlled by a third party. In a multi-tenant system or implementation, each tenant/customer may access portions of a given cloud server. In some embodiments, the cloud services may store the user data on the cloud server. The user data may be stored by the cloud services for on-premises deployment (for instance, deployment on or by a local or tenant server, by enterprise application stores or portals such as Citrix StoreFront by Citrix Systems, Inc. of Fort Lauderdale, Fla., and so forth, which may be owned, operated, controlled, etc. by a customer/tenant). In such embodiments, the customer/tenant may access the cloud server to retrieve user data for on-premises deployment. The user data stored in and/or by the cloud services may be encrypted. In some implementations, the cloud services may not include or possess the encryption key and, as such, cannot decrypt the user data. Such embodiments reduce the complexity of the systems and methods described herein.

Various enterprise application stores, such as Citrix StoreFront, are configured to provide users access to hosted resources, such as hosted applications or desktops, which may be hosted on cloud server(s), on-premises or local server(s), etc. Such hosted resources may be provided to the user through a web browser, native receiver application, and so forth. A number of servers can form a server group to provide high-availability of hosted resources for a geographic location. A global organization or enterprise may deploy several local or on-premises server/server groups (e.g., one for each geographic location) to serve the global enterprise's user base at a given geographic location.

In environments in which a user may access various hosted resources, it may be desirable to maintain each user's data, such as favorite resources, user settings for their favorite resources, and so forth. In implementations which do not include some of the systems and methods described herein, the user data may be stored in a file database on the enterprise application store server. The user data are then replicated among each of the servers in a service group. In some implementations, the user data may be replicated using Microsoft Peer Mesh technology. Recently, Microsoft Peer mesh technology has become depreciated, and enterprises are finding that setting up cross-group data synchronization can be cumbersome and unreliable.

The present disclosure provides a solution to the problems identified in the prior art by offloading storage of user data to cloud services while maintaining the security of the user data at the cloud services. For instance, the present disclosure describes providing a cloud service that is hosted in a public cloud (such as the Citrix cloud). User data is encrypted prior to sending the user data to the public cloud. The user data is stored in a globally available cloud-hosted database, such as Azure CosmosDB. The encryption key for decrypting the encrypted user data is securely stored, for instance, in the enterprise's on-premises active directory. Users, such as employees of an enterprise (for instance, a tenant) can retrieve the encrypted user data by providing a ticket which requests the encrypted user data. The user's identity is confirmed, and the encrypted user data is transmitted to the user. The embodiments described herein reduce the complexity of on-premises resource storage and deployment by offloading the encrypted user data to cloud services. The embodiments described herein securely store user data, as the cloud services stores the encrypted user data without the decryption key. Such embodiments ensure that the user data is secure against inadvertent or malicious interception.

Prior to storing user data, an on-premises server of a tenant enrolls with the cloud services. In some embodiments, an administrator operating a user interface for a device can present proof of entitlement to access cloud services, such as licensing. Upon successful enrollment of the tenant, the cloud services may issue a tenant service key and endpoint information to the tenant. The tenant service key and endpoint information may be used by the tenant for accessing the cloud services.

The server of the tenant may act as a receiver for various clients or client devices. Prior to the clients reading or writing the user data, the clients may obtain a ticket (also referred to herein as "User data access ticket"). To obtain the user data access ticket, the server of the tenant may receive a request from the client. The server of the tenant may generate an encryption key for the client and store the encryption key in a tenant active directory (e.g., as a confidential attribute). The server may provide the user data access ticket to the client.

To store user data at the cloud services, the client may encrypt user data using the encryption key. The client may transmit a request to store user data to the server for the tenant, which may in turn be transmitted to the cloud services. The request may include the user data access ticket and the encrypted user data. The cloud services may validate the user data access ticket, and store the encrypted user data (e.g., at cloud services, at a server communicably coupled to the cloud services, and so forth). The client may subsequently retrieve the encrypted user data in a similar request to the tenant, which is routed to the cloud services. The cloud services may validate the user data access ticket and transmit the encrypted user data to the client.

In some implementations, the server and/or client may rotate the encryption key. In such implementations, the server and/or client may fetch the encrypted user data from the cloud services (e.g., as briefly outlined described above), decrypted using the old encryption key, re-encrypted using a new encryption key, and transmitted to the cloud services in a request to store user data. In some implementations, rather than routing requests through a server of the tenant, the client may route requests directly to cloud services. Such implementations may reduce tenant server load. In some implementations, rather than the encryption key stored in an active directory at the tenant, the encryption key may be stored in a secure location by cloud services. While described herein as storing user data, it should be understood that the present disclosure may be adapted to securely store any types of data for on-premises services.

Figure 2:
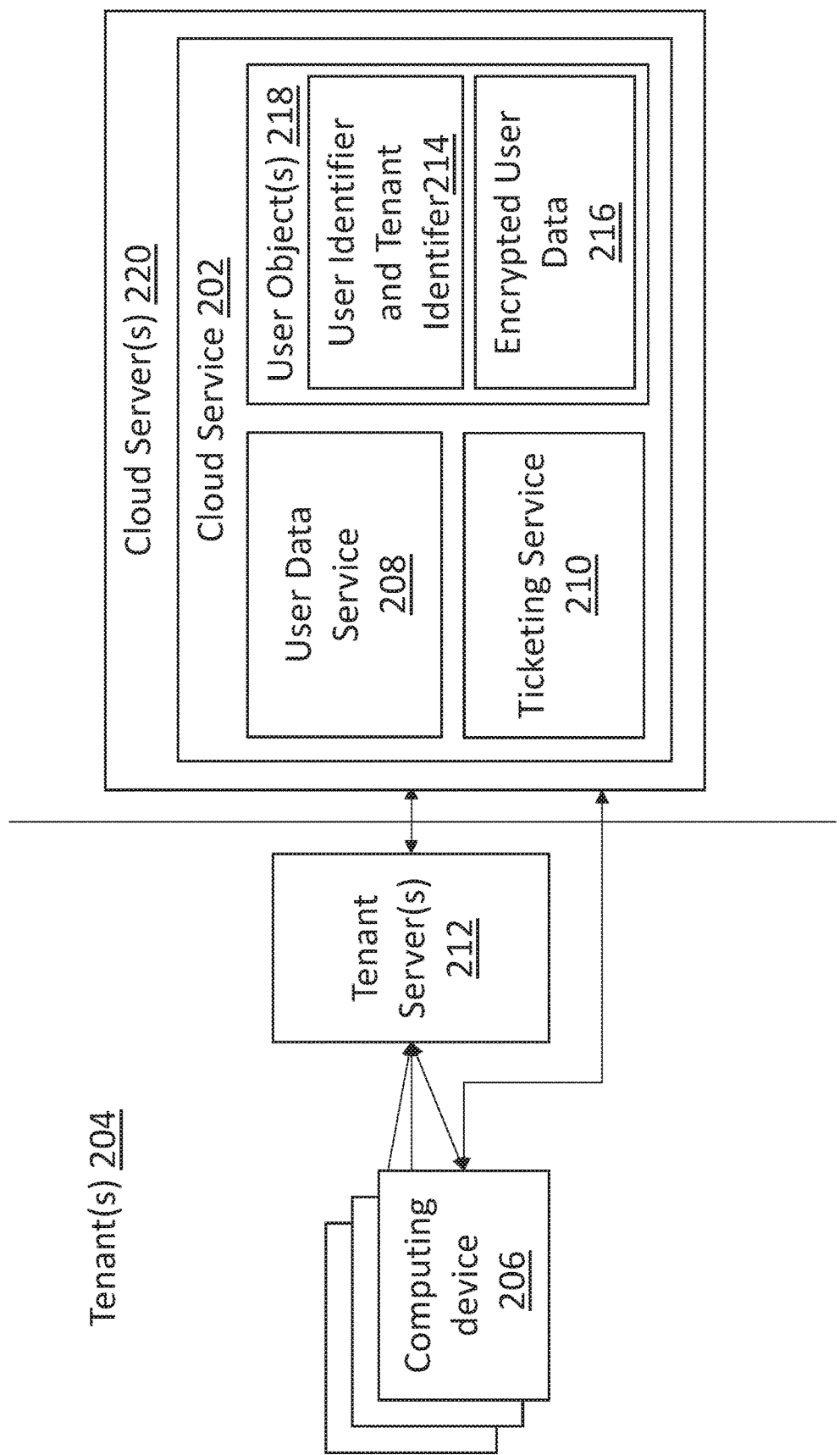
FIG. 2 is a system for accessing encrypted user data at a multi-tenant hosted cloud service.

Referring now to FIG. 2, a system 200 for accessing encrypted user data at a multi-tenant hosted user data service is shown, according to an illustrative embodiment. The system 200 is shown to include cloud services 202, a plurality of tenants 204, and a plurality of computing devices 206. Each tenant 204 may be associated with one or more computing devices 206 and servers 212. Cloud services 202 may generally be hosted on, implemented on, executed on, or otherwise incorporated into one or more cloud servers 220. Cloud services 202 is shown to include a user data service 208 and a ticketing service 210. The user data service 208 may be hosted on the cloud servers 220 for multiple tenants 204 on cloud services 202. The user data service 208 may be hosted for the tenants 204 responsive to enrollment in the user data service 208. The user data service 208 may be configured to communicate a tenant service key and information on a service endpoint for each tenant 204 to a tenant server 212 for the respective tenant 204. The ticketing service 210 may be configured to receive a request for a ticket for a user of a tenant 204 to access the user data service 208. The ticketing service 210 may receive the request at the service endpoint from the tenant server 212 for the tenant 204. The request may include a user identifier for the user and a tenant identifier of the tenant 204. The ticketing service 210 may provide a user data access ticket 214 for the user to access the user data service 208 responsive to receiving the request. The user data service 208 may be configured to receive a request to store user data of the user at the user data service 208. The request may include the user data access ticket 214 and encrypted user data 216. The user data service 208 may be configured to validate the user data access ticket 214 with the ticketing service 210. The user data service 208 may be configured to store the encrypted user data 216 of the user associated with the user identifier and tenant identifier. The user data service 208 may be configured to provide the encrypted user data 216 to a computing device 206 of the user responsive to validating the user data access ticket 214 received from the computing device 206 of the user.

The systems and methods of the present solution may be implemented in any type and form of device, including clients, servers and/or appliances described above with reference to FIG. 1. As referenced herein, a "server" may sometimes refer to any device in a client-server relationship, e.g., a tenant server 212 in a handshake with a computing device 206, a cloud server 220 in a handshake with a tenant server 212, and so forth. In some embodiments, the tenant server 212 and cloud server 220 may be located in close geographical proximity to each other. For instance, the tenant server 212 and cloud server 220 may be located within the same geographical area (e.g., the same building, city, state, region, country, etc.). Such embodiments may improve the speed at which content or data is delivered/exchanged between the servers 212, 220, lessen latency, and lessen the likelihood of inadvertent or malicious interception of content between the servers 212, 220 (thus improving or satisfying Global Data Protection Regulation (GDPR) compliance).

The computing devices 206, tenant server 212, and/or cloud server 220 may include or incorporate components and devices similar in some aspects to those described above with reference to FIG. 1. The present systems and methods may be implemented in any embodiments or aspects of the appliances or devices described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

The system 200 is shown to include one or more tenant(s) 204. Each of the tenants 204 may include, manage, own or maintain at least one corresponding tenant server 212 which may be configured to communicate with computing devices 206, such as computing devices of users associated with the tenant 204. Hence, a first tenant 204 including a first tenant server 212 may be associated with a first group of computing devices 206, a second tenant 204 including a second tenant server 212 may be associated with a second group of computing devices 206, and so forth. In some embodiments, the tenants 204 may be enterprises with the tenant server(s) 212 being configured to facilitate computing, offloading resources, and so forth for computing device(s) 206 of the tenant 204. In some implementations, a tenant 204 may include a plurality of tenant sever(s) 212, which may be deployed or otherwise located at various geographic locations for the tenant 204. The computing device(s) 206 may be or include user-operated computing devices, network devices which deliver or exchange content with user-operated computing devices, and so forth. In some embodiments, the computing devices 206 may be or include a receiver, such as a receiver operating a web browser or native receiver (such as a Citrix Receiver).

Each tenant 204 is shown to include, manage, maintain or own a tenant server 212. The tenant server 212 may be or include any device(s) or component(s) configured to execute or perform various functions. In some embodiments, the tenant server 212 may include or otherwise communicate with a StoreFront server. The tenant server 212 may be configured to provide one or more resources to the respective computing devices 206. Each of the resources can include or correspond to any type or form of application or service. The application or service may include a network application, a web application, a Software-as-a-Service (SaaS) application, a remote-hosted application, and so on. As some non-limiting examples, an application can include a word processing, spreadsheet or other application from a suite of applications (e.g., Microsoft Office360, or Google docs), an application hosted and executing on a server for remote provisioning to a client, and/or a HTML5-based application. Packets corresponding to a given resource may be encrypted by the tenant server 212 and transmitted or delivered to the computing device 206.

Users who operate a given computing device 206 may have user data corresponding to such resources. "User data," as used herein, refers to any data corresponding to a user which is generated by or for the user. In some embodiments, the user data may be or include user preference data. For instance, the user preference data may be enterprise preference data which are universal to all users within an enterprise. The user preference data may be individual preference data for a particular user. In some embodiments, each application may have corresponding user preference data. Various examples of user data include, for instance, default or user-defined settings for a given application, pages which are automatically viewed when an application launches, viewing data for pages, text or image size, window size, font, user-generated files or folders (including folder structures), images, other content generated by or for the user, and so forth. Where a user operates different computing devices 206, it may be desirable to transfer such user data (including user preferences) between computing devices 206. Hence, the systems and methods described herein may generally be used for transferring user data between computing devices 206.

The computing devices 206 may be configured to transmit various information, data, and requests to the tenant server 212 of tenant 204 and/or to cloud service 202. For instance, the computing devices 206 may be configured to transmit user data access information requests, user authorization tokens associated with the computing device 206 and/or a particular user, a request for saving user data, and so forth. The computing devices 206 may be configured to transmit such information, data, and requests via a network which communicably couples the computing devices 206, tenant server 212, and/or cloud server(s) 220 which host or otherwise execute the cloud service 202. The computing devices 206 may be configured to retrieve, receive, or otherwise access stored encrypted user data from the cloud service 202.

In some embodiments, the computing device 206 may encrypt user data. The computing device 206 may encrypt the user data according to various cryptographic protocols or algorithms. Various examples of such protocols include, for instance, one or more symmetric-key algorithms, such as block ciphers (e.g., Advance Encryption Standard (AES) of 128 bits or 256 bits, Rivest Cipher-5 (RC5) of 64 bits or 128 bits, or Blowfish cipher), stream ciphers (e.g., A5/1, A5/2, HC-256, or Rivest Cipher-4 (RC4) or 1684 or 2064 bits), or others (e.g., Kerberos protocol); asymmetric-key algorithms (e.g., Digital Signature Algorithm, Elliptic Curve algorithm, Rivest-Shamir-Adleman (RSA), and Diffie-Hellman key exchange protocol); and cryptographic hash functions (e.g., hash-based message authentication code (HMAC), message-digest algorithm (MD5), and Secure Hash Algorithm (SHA-1, SHA-2, and SHA-3)). The encrypted user data can incorporate, specify or include key-related information, such as a set of non-secret key-value pairs. The encrypted user data can provide an indication (e.g., an identifier, handle, name and/or type) of a cryptographic service provider (CSP), and can include the specification of a particular key container (e.g., within the CSP). In some embodiments, the tenants 204 (e.g., the tenant server 212) may specify the cryptographic protocol used for encrypting/decrypting the user data. For instance, the tenants 204 may be configured to generate an encryption key for the computing devices 206, and the tenant server 212 may be configured to provide the encryption key to the computing devices 206. In some embodiments, each computing device 206 may determine, identify, or use (e.g., on an individual basis) a particular cryptographic protocol for encrypting/decrypting the user data. As described in greater detail below, the encrypted user data may be stored by the cloud service 202 (e.g., as encrypted user data 216).

The computing devices 206 may be configured to transmit encrypted user data to the user data service 208. In some embodiments, the computing devices 206 may be configured to generate a packet containing the encrypted user data and a user data access ticket. The computing devices 206 may be configured to transmit, send, deliver, or otherwise provide the packet containing the encrypted user data and user data access ticket to the user data service 208 (e.g., an endpoint for the user data service 208). As described in greater detail below, the user data service 208 may be configured to store the encrypted user data. The user data service 208 may generally validate the user data access ticket, and store the encrypted user data for the computing device.

The computing devices 206 may subsequently retrieve the encrypted user data by providing the user data access ticket with a request. The computing devices 206 may be configured to generate a request for retrieving the encrypted user data. The request may be structured to include the user data access ticket. The computing devices 206 may send, transmit, deliver, or otherwise provide the request to the user data service 208 similar to the request for saving the encrypted user data. The user data service 208 may validate the user data access ticket, retrieve the encrypted user data (e.g., by using the indexed user identifier/tenant identifier or locating the encrypted user data), and transmit the encrypted user data. The computing devices 206 may be configured to decrypt the encrypted user data, and consume, access, or otherwise use the user data. According to such embodiments, the user data may be encrypted and decrypted by the computing devices 206 (e.g., using the encryption key which may be generated and/or stored by or at the tenant 204, as described in greater detail below).

In some embodiments, each tenant 204 may include a dedicated computing device (or other device with a corresponding user interface). The dedicated computing device may be an administrator computing device with a corresponding administrator user interface. As discussed in greater detail below, the computing device for the tenants 204 may be used, operated, or otherwise controlled for enrolling the tenant 204 with cloud services 202 for accessing the user data service 208 described herein. The computing device for each tenant 204 may be similar to the computing devices 206 described herein.

The tenant server 212 may be configured to enroll with the user data service 208 so that the computing device(s) 206 may securely store encrypted user data with the cloud service 202 (e.g., on memory or other data store for the cloud server 220). In some embodiments, the tenant server 212 may be configured to enroll with the cloud service 202 by transmitting an enrollment request from the tenant 204 to the cloud service 202 (e.g., from the tenant server 212 to a service endpoint for cloud service 202). The service endpoint may be a port on a server, a secure channel, or other specific address, location, or channel by which data is exchanged between the tenant 204 and cloud service 202. In some embodiments, the tenants 204 may enroll with the cloud service 202 by an operator controlling the device (e.g., a user interface for the device) corresponding to the tenant 204. For instance, the operator may control the user interface of the device corresponding to the tenant 204 to begin the enrollment process with the cloud service 202. The device may receive user interface inputs from the operator corresponding the enrollment request, and the device may transmit the enrollment request responsive to receiving the inputs. The user data service 208 may be configured to receive the enrollment request at the service endpoint, and the user data service 208 may be configured to transmit a challenge for enrollment information to the tenant 204, as described in greater detail below.

The tenant server 212 may be configured to respond to a challenge for enrollment information. The challenge for enrollment information may be displayed, rendered, or otherwise provided on a user interface for the device associated with the tenant 204. The challenge for enrollment information may be data, a packet, information, a request, or other structured data which prompts the tenant 204 to respond with enrollment information. In some embodiments, the enrollment information may be or include license information, a unique code or software key, or other type of information which indicates entitlement or presents proof of access to the cloud service 202 (specifically, to the user data service 208 of cloud service 202). An operator (or other user, administrator, etc.) may control the user interface for the device corresponding to the tenant 204 which received the challenge to provide the enrollment information corresponding to the challenge. The operator may provide the user interface for the device corresponding to the tenant 204. The operator may purchase a license to use the user data service 208, and the license may include a code associated with the license. The operator may provide the code to the user interface for the device corresponding to the tenant 204. The device may route the enrollment information to the user data service 208.

In some embodiments, the tenant server 212 may be configured to automatically respond to the challenge for enrollment information. The tenant server 212 of the tenant 204 may be configured to automatically generate, identify, produce, or otherwise provide the enrollment information, and tenant server 212 may be configured to transmit the enrollment information to the user data service 208. Hence, the tenant server 212 may be configured to automatically respond to the challenge without user or operator intervention or input.

In each of these embodiments, the tenant server 212 of the tenant 204 may be configured to transmit enrollment information to the cloud service 202 (e.g., to the endpoint for the user data service 208). The user data service 208 may be configured to validate the enrollment information. Responsive to the enrollment information being validated, the user data service 208 may be configured to transmit a service key associated with the tenant 204 and endpoint information corresponding to the user data service endpoint to the tenant server 212 of the tenant 204. As described in greater detail below, the service key may be used by the user data service 208 to authenticate the tenant server 212 and to determine whether a particular computing device 206 has access to the user data service 208, and the endpoint information may be used by the computing device 206 for transmitting various requests and information to the user data service 208.

The tenant server 212 may be configured to receive user data access information from the computing devices 206. The user data access information may be or include, for instance, a user authentication token, log-in information, a PIN, biometric information for the user, a digital fingerprint associated with the user, and so forth. The tenant server 212 may be configured to validate the user data access information from the computing device 206. The tenant server 212 may be configured to validate the user data access information by cross-referencing the data provided within the information with data stored by each tenant server 212 for their associated computing devices 206. In some embodiments, the access information may be uniquely associated with a particular user. In such embodiments, the tenant server 212 may be configured to store data associated with particular users, and such data may be cross-referenced with data within the access information from the computing devices 206.

The tenant server 212 of the tenant 204 may be configured to generate the ticket request responsive to receiving the user data access information from the computing device 206. The tenant server 212 may be configured to determine whether the tenant server 212 generated an encryption key for the user corresponding to the user data access information. The tenant 204 may be configured to generate a command for the active directory to retrieve the encryption key. Where the tenant server 212 has not generated an encryption key for the user, the active directory may return a null value indicating that no encryption key has been generated for the user.

As briefly described above, the tenant server 212 of the tenant 204 may be configured to generate an encryption key for each of the users corresponding to a tenant. The tenant server 212 may be configured to generate the encryption key for each user upon the first instance of the tenant server 212 receiving the user data access information from the computing devices 206 operated by a respective user. The encryption key may be a key which is generated in accordance with an encryption or cryptographic protocol. In some embodiments, the tenant server 212 may be configured to generate the encryption key for each user responsive to enrollment with the cloud service 202. Each encryption key may be specific, distinctive, or otherwise unique to a corresponding user. In some embodiments, the encryption keys may be standard encryption keys used by each of the computing devices 206 for the respective user associated with a particular tenant 204. In some embodiments, the tenant server 212 may be configured to store a copy of the encryption key for each of the users. The tenant server 212 may be configured to store the encryption key in, for instance, a secure location at the tenant 204 (such as an active directory). The tenant server 212 may be configured to store the encryption key as a confidential attribute for a data set, object, or other structure associated with the user of the computing device 206 in the active directory.

Where the tenant server 212 of the tenant 204 has previously generated an encryption key for the user, the tenant server 212 may be configured to generate a ticket request. The ticket request may be a request for a user data access ticket for a particular user operating the computing device 206. In some embodiments (e.g., for added security purposes), the user data access ticket may be associated with a particular user and associated with a particular computing device 206. The tenant server 212 may be configured to generate the ticket request responsive to receiving the user data access information from the computing device 206 (e.g., operated by the user). The user data access ticket may be a ticket which is specifically used by a particular user of a computing device 206 to access the user data service 208. The request may be a structured data packet which includes various information. For instance, the structured data packet may include, for instance, a user identifier corresponding to the user. The user identifier may be a pin or alphanumerical code associated with the user, a user name, etc. The packet may include a header which indicates a target destination (e.g., the ticketing service 210) for the packet corresponding to the ticket request. The tenant server 212 of the tenant 204 may be configured to communicate the ticket request to the endpoint corresponding to the cloud service 202. The ticketing service 210 may be configured to save the user identifier and tenant identifier corresponding to the service key, generate a user data access ticket for the computing device 206, and communicate the user data access ticket to the tenant 204, as described in greater detail below.

The tenant server 212 may be configured to generate a packet for communication, transmission, delivery, etc. to the computing device 206. The packet may be a data structure containing, for instance, the encryption key for the computing device 206 and the user data access ticket received from the ticketing service 210. The tenant server 212 may be configured to generate the packet for delivery to the computing device 206 responsive to receiving the user data access ticket from the ticketing service 210. The computing device 206 may be configured to user the user data access ticket for storing and/or retrieving encrypted user data to/from the user data service 208, as described above.

In some embodiments, the computing device(s) 206 and corresponding tenant 204 may reside at a branch office and may operate within a client-side network, which may include or correspond to a private network (e.g., a local area network (LAN) or wide area network (WAN)) between or spanning the computing device(s) 206 and tenant(s)s 204. In some embodiments, the tenant(s) 204 and the cloud service 202 may be communicably coupled to one another via a private network (e.g., a LAN or a software-defined wide area network (SD-WAN)). The cloud service 202 may reside at a server or data center, and may operate within a server-side network, which may also be a private network (e.g., a LAN, WAN, etc.).

Cloud service 202 may include any device(s) or component(s) configured to deliver or exchange data with a device (such as the tenant server 212 for the tenant 204, computing devices 206, etc.). In some embodiments, cloud service 202 may be similar in some aspects to a server (such as tenant server 212) configured to deliver a service, resource, application, and so forth to a client. Cloud service 202 is shown to include a user data service 208 and ticketing service 210. Each of these services 208, 210 may be or include resources, programs, instructions, etc. which are offered to subscribing or enrolled tenants 204, as described in greater detail below.

The user data service 208 may be configured to enroll a tenant 204 with the user data service 208. The user data service 208 may be configured to receive a request for enrollment from a tenant 204 (e.g., a device associated with the tenant 204). The request from the tenant 204 may be the enrollment request described above. The request may be initiated by an administrator operating a user interface on a device associated with the tenant 204. The user data service 208 may be configured to receive the request at a service endpoint for the user data service 208 (e.g., a port for a server associated with cloud service 202, or some other specific address which receives incoming data or messages from devices such as the tenant 204). In some embodiments, the device associated with the tenant 204 may be configured to route, deliver, transmit, or otherwise provide the request directly to the user data service 208. In some embodiments, the device associated with the tenant 204 may be configured to provide the request through the tenant 204 to the user data service 208.

In some embodiments, the user data service 208 is configured to communicate a challenge for enrollment information to the tenant 204 responsive to receiving the enrollment request from the tenant 204 (e.g., or the device associated with the tenant 204). The user data service 208 may be configured to transmit the challenge for enrollment information to the user interface for the device corresponding to the tenant 204. The challenge may be a request for particular enrollment information which indicates the tenant 204 may be permitted access to the user data service 208. For instance, the enrollment information may be or include license information. The tenant 204 may correspondingly respond with enrollment information as described above.

In some embodiments, the user data service 208 is configured to determine whether the tenant 204 (e.g., the device controlled by the operator for enrolling with the user data service 208) provided authentic, authorized, proper, or otherwise valid enrollment information to the user data service 208. The user data service 208 may be configured to validate the enrollment information provided by the tenant 204. The user data service 208 may be configured to validate the enrollment information by cross-referencing the enrollment information with a database or dataset of valid enrollment information, by identifying particular segments or packets within the enrollment information which verify the authenticity of the enrollment information, and so forth.

The user data service 208 may be configured to generate a service key. The service key may be a key, packet, or other structured dataset which is uniquely associated with a tenant 204. The user data service 208 may be configured to generate the service key responsive to validating the enrollment information from the tenant 204. Each enrolled tenant 204 may include a corresponding service key. The service key may be used for subsequently authenticating the tenant 204. The service key may include data which is associated with a tenant 204 and may be extracted by the user data service 208 for identifying the particular tenant 204 associated with the service key. The data may include a tenant identifier. In some embodiments, the user data service 208 and/or ticketing service 210 may maintain a list, dataset, index, etc. of tenant identifiers. The user data service 208 and/or ticketing service 210 may be configured to modify the index to include a new tenant identifier when a new tenant 204 is successfully enrolled. The user data service 208 and/or ticketing service 210 may be configured to assign the new tenant identifier to the new tenant 204. Hence, the index may be a rolling list of tenant identifiers associated with the enrolled tenants 204.

The user data service 208 may be configured to generate an enrollment packet containing the service key and endpoint information associated with the user data service 208 to the tenant 204. The user data service 208 may be configured to generate the enrollment packet responsive to successful enrollment and generation of the service key. The endpoint information may be an address, port, or other location in which the tenant 204 (or computing device 206) is to deliver packets, requests, or other data/information to the user data service 208. The user data service 208 may be configured to provide the enrollment packet to the tenant 204. As described above, the tenant server 212 may be configured to reproduce the information contained in the enrollment packet, and provide the copied endpoint information to the computing devices 206 associated with the tenant 204.

As described in greater detail below, the ticketing service 210 may be configured to receive a ticket request for a user data access ticket containing the service key generated by the user data service 208. The ticketing service 210 may be configured to save a tenant identifier corresponding to a tenant 204 and a user identifier corresponding to a user to an index, generate a user data access ticket, and provide the user data access ticket to the tenant 204. The tenant 204 may then provide the user data access ticket to the computing devices 206 associated therewith (along with the encryption key described above). The computing devices 206 may encrypt their user data and store/subsequently retrieve those encrypted user data with the user data service, as described in greater detail below.

The user data service 208 may be configured to receive a request for saving user data. The user data service 208 may be configured to receive the request at the endpoint for the cloud service 202. In some embodiments, the request may include the user data access ticket and encrypted user data. The user data service 208 may be configured to receive the request directly from the computing devices 206. The user data service 208 may be configured to receive the request indirectly from the computing devices 206 (e.g., through the tenant 204, through another intermediary or network device/node, and so forth). The user data service 208 may be configured to determine the user and tenant identity based on the user data access ticket contained, incorporated, or otherwise included in the request. The user data service 208 may be configured to determine the identity of the user and tenant by requesting the user and tenant identity from the ticketing service 210. The user data service 208 may be configured to generate an identity request for the ticketing service 210 including the user data access ticket. The ticketing service 210 may be configured to validate the user data access ticket, and identify the indexed tenant identifier and user identifier associated with the user data access ticket, and provide the tenant identifier and user identifier to the user data service 208, as described in greater detail below.

The user data service 208 may be configured to receive the tenant identifier and user identifier corresponding to a request for saving encrypted user data from the ticketing service 210. The user data service 208 may be configured to store the encrypted user data. The user data service 208 may be configured to store the encrypted user data associated with the user identifier. The user data service 208 may be configured to store the encrypted user data at a server, memory, or other storage device or medium for the cloud service 202. The user data service 208 may be configured to maintain the user data from the computing device 206 in an encrypted state. Hence, the user data may be encrypted by the computing device 206 for storage, and decrypted by the computing device 206 responsive to retrieval, as described in greater detail below.

The user data service 208 may be configured deliver stored encrypted user data to a computing device 206. The user data service 208 may be configured to receive a request for retrieving user data from a computing device 206. The computing device 206 may be the same computing device 206 which communicated the request for storing encrypted user data, or the computing device 206 may be a different computing device 206 from the computing device 206 which communicated the request for storing the encrypted user data. In each embodiment, the request for retrieving user data may include the user data access ticket associated with a user. Similar to storing the encrypted user data, the user data service 208 may be configured to validate the user data access ticket, identify the tenant identifier and user identifier, and retrieve the encrypted user data by cross-referencing the encrypted user data with the identified tenant identifier and user identifier. The user data service 208 may be configured to transmit the encrypted user data to the computing device 206. The computing device 206 may decrypt the encrypted user data, and apply the user data to the resources provided by the tenant 204 to the computing device 206.

The ticketing service 210 may be configured to generate tickets for computing devices 206 and validate previously-generated tickets. The ticketing service 210 may be configured to generate tickets based on requests from the tenants 204. The ticketing service 210 may be configured to validate tickets from user data service 208 responsive to requests from a computing device 206 to store/retrieve encrypted user data to/from the user data service 208. Each of these aspects are described in greater detail below.

The ticketing service 210 may be configured to receive a request for a ticket from the tenant 204. The ticket request may be structured to include various information including, but not limited to, a service key and a user identifier. The service key may be generated by the user data service 208 at enrollment by a tenant 204 with the cloud service 202. The service key may include identifier information corresponding to the tenant 204. The user identifier may be used by the ticketing service 210 for indexing user data, as described in greater detail below.

The ticketing service 210 may be configured to extract the service key from the ticket request from the tenant 204. In some embodiments, the ticketing service 210 may be configured to extract the service key to identify a tenant identifier associated with the tenant 204. Such embodiments may function to both validate the tenant's 204 access to the cloud service 202, and to identify the particular tenant 204 which is accessing the cloud service 202. The ticketing service 210 may be configured to identify the tenant identifier within the service key. The ticketing service 210 may be configured to save the tenant identifier and user identifier. In some embodiments, the ticketing service 210 is configured it index the tenant identifier and user identifier extracted from the service key and request.

The ticketing service 210 may be configured to build, assemble, construct, or otherwise generate a user data access ticket. The ticketing service 210 may be configured to generate the user data access ticket based on the tenant identifier and user identifier (e.g., extracted either directly or indirectly from the request). The user data access ticket may be uniquely associated with a particular user. Hence, the user data access ticket may be uniquely structured according to the user identifier and tenant identifier. The ticketing service 210 be configured to transmit, deliver, or otherwise provide the user data access ticket to the computing device 206. In some embodiments, the ticketing service 210 may be configured to provide the user data access ticket to the tenant server 212, and the tenant server 212 may provide the user data access ticket to the computing device 206.

In some embodiments, the ticketing service 210 may maintain a copy of the user data access ticket, or data corresponding to the user data access ticket. The ticketing service 210 may be configured to use the copy/data to validate received user data access ticket. The ticketing service 210 may be configured to maintain the copy/data corresponding to the user data access ticket in an index associated with the tenant identifier and user identifier.

The ticketing service 210 may be configured to receive an identity request from the user data service 208. The user data service 208 may be configured to provide the identity request responsive to receiving a request to store (or retrieve) encrypted user data. The identity request may be structured to include the user data access ticket (which may be provided by the computing device 206 to the user data service 208 in the request to store or retrieve encrypted user data). The ticketing service 210 may thus be configured to receive the user data access ticket from the user data service 208.

In some embodiments, the ticketing service 210 is configured to validate the user data access ticket. The ticketing service 210 may be configured to validate the user data access ticket by identifying various data incorporated into the user data access ticket. Such various data may be incorporated into the user data access ticket for subsequently identifying the authenticity of the user data access ticket. Such data may include, for instance, a digital signature or fingerprint, a PIN, an alphanumerical code, or other data which may be used for validating the authenticity of structured data. The ticketing service 210 may be configured to validate the user data access ticket responsive to positively identifying such authentication/validation data incorporated by the ticketing service 210 to the user data access ticket.

The ticketing service 210 may be configured to cross-reference the user data access ticket with the index maintained by the ticketing service 210. The ticketing service 210 may be configured to perform such cross-referencing responsive to validating the user data access ticket. The ticketing service 210 may be configured to identify the tenant identifier and user identifier associated with the user data access ticket based on the index (e.g., containing the tenant identifier, user identifier, and data corresponding to the user data access ticket). The ticketing service 210 may be configured to provide, deliver, or otherwise communicate the tenant identifier and user identifier to the user data service 208, and the user data service 208 may store the encrypted user data associated with the user identifier and tenant identifier.

Figure 3A:
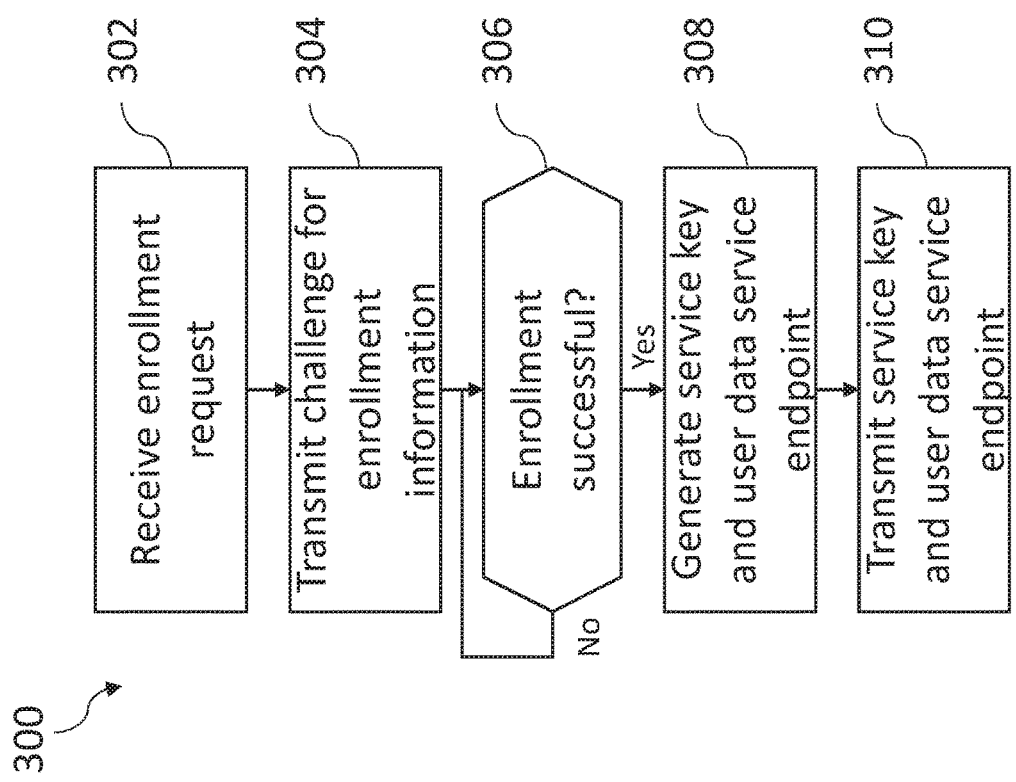
FIG. 3A and FIG. 3B are flowcharts showing a method of enrolling with a cloud service.
Figure 3B:
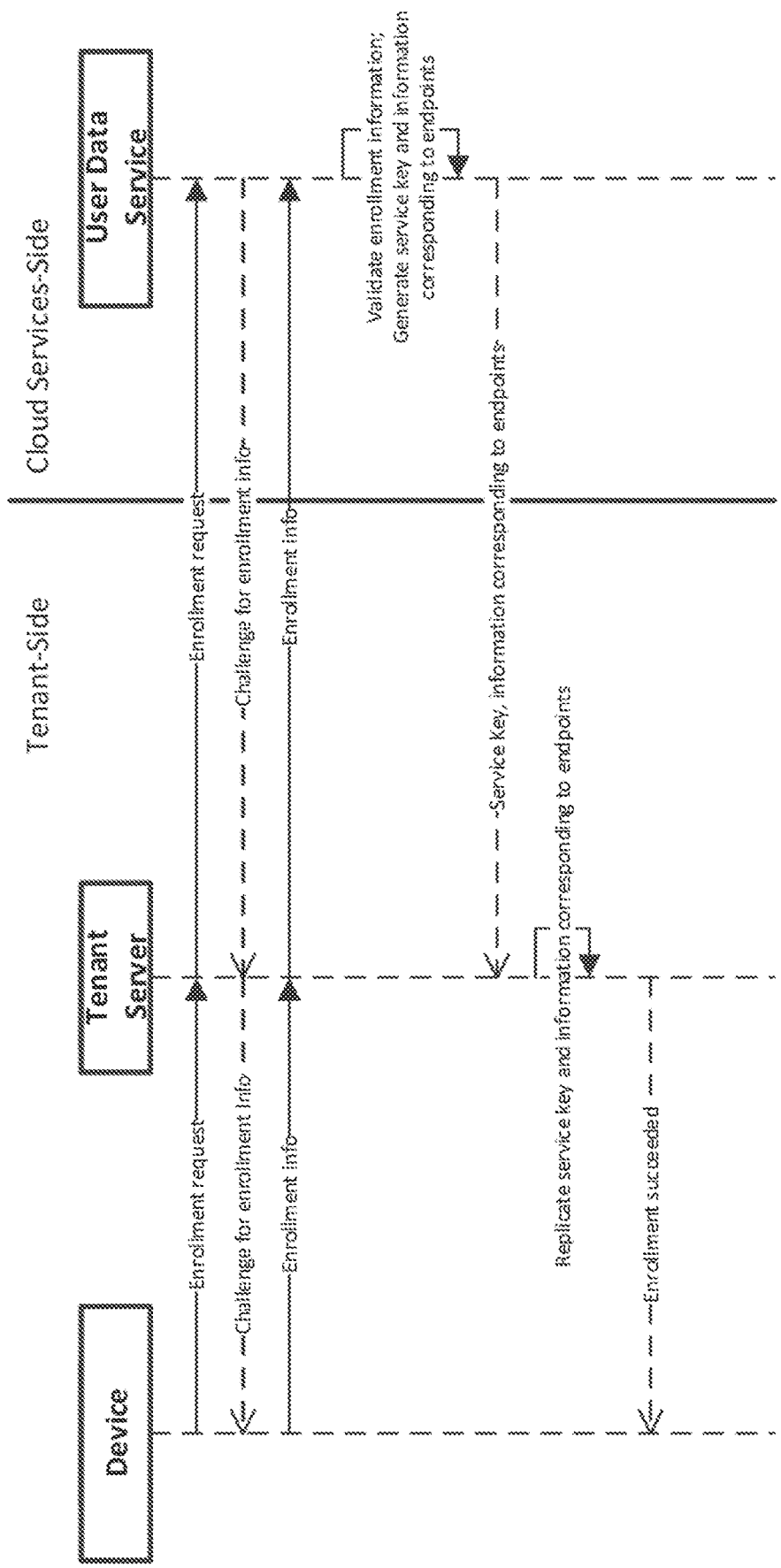

Referring now to FIG. 3A and FIG. 3B, depicted are flowcharts showing a method 300 of enrolling with cloud service 202. The operations described with reference to FIG. 3A and FIG. 3B may be practiced with the components, elements, devices, and so forth described above. However, it should be understood that the method 300 is not limited to the particular components, elements, devices, etc. Generally speaking, at operation (302), the cloud service may receive an enrollment request. At operation (304), the cloud service may transmit a challenge for enrollment information. At operation (306), the cloud service may determine whether enrollment was successful. The method 300 may loop at operation (306) until enrollment is successful. When enrollment is successful, the method 300 may proceed to operation (308), where the cloud service generates a service key and user data service end points. At operation (310), the cloud service may transmit the service key and user data service endpoints.

At operation (302), the cloud service may receive an enrollment request. The tenants may enroll with the cloud service. The tenants may be enrolled with the user data service by an administrator or operator controlling a user interface for a device corresponding to the tenant. The administrator may generate an enrollment request for enrolling with cloud service at the user interface for the device. The device may transmit the enrollment request to the cloud service. In some embodiments, the device may transmit the enrollment request to the server of the tenant, and the server may provide the enrollment request to the cloud service. The cloud service may receive the enrollment request from the server/device.

At operation (304), the cloud service may transmit a challenge for enrollment information. The challenge may be a request, prompt, or other type of call for enrollment information. The enrollment information may be information provided by the administrator which is used for determining whether the tenant is authorized to access the cloud service. The cloud service may transmit the challenge to the device corresponding to the tenant (e.g., directly or through the tenant). The administrator may respond with enrollment information which may be or include a license, unique identifier, pin, or other type of information which indicates the tenant is authorized to access the cloud service. The administrator may respond on the device associated with the tenant, and the device may correspondingly route the response from the administrator containing the enrollment information to the cloud services.

At operation (306), the cloud service may determine whether enrollment was successful. Where the enrollment by the tenant is not yet successful, the method 300 may loop at operation (306). When the tenant successfully enrolls with the cloud services, the method 300 may proceed to operation (308). The cloud service may determine whether the enrollment was successful based on the enrollment information received from the administrator. The cloud services may identify specific data contained in the enrollment information to determine the authenticity of the enrollment information. The cloud service may thus validate the enrollment information. Where the cloud service successfully validates the enrollment information, the tenant may be determined to have successfully enrolled.

At operation (308), the cloud service may generate a service key and information corresponding to a user data service endpoint (e.g., the endpoint for the client service described above). The service key may be or include structured data which is uniquely associated with the tenant. The service key may be or include structured data which is uniquely associated with the tenant and indicates that the tenant has successfully enrolled with the cloud service. The cloud service may subsequently receive the service key associated with a tenant from a computing device associated therewith, and the cloud service may grant the computing device access to the cloud service, as described in greater detail below.

At operation (310), the cloud service may transmit the service key and user data service endpoint. In some embodiments, the cloud service may transmit the service key and user data service endpoint to the tenant (e.g., to the server of the tenant). In some embodiments, the cloud service may transmit the service key and user data service endpoint to the tenant across the network connection in which the cloud service received the enrollment request and the enrollment information.

In some embodiments, the server of the tenant may replicate the information (e.g., service key and information corresponding to the user data service endpoint) received from the cloud service. The server may replicate the information for each of the computing devices which are associated with the tenant and associated with the server (e.g., members of the server group). The server may transmit, deliver, or otherwise provide the replicated service key and user data service endpoint information to the computing devices. As such, following a request for enrollment by the tenant (and corresponding successful enrollment), the server may receive the service key and endpoint information from the cloud service, and the server may deliver copies of the service key and endpoint information to the computing devices. The computing devices may use the service key and endpoint information for storing and retrieving user data at the user data service, as described in greater detail below.

Figure 4A:
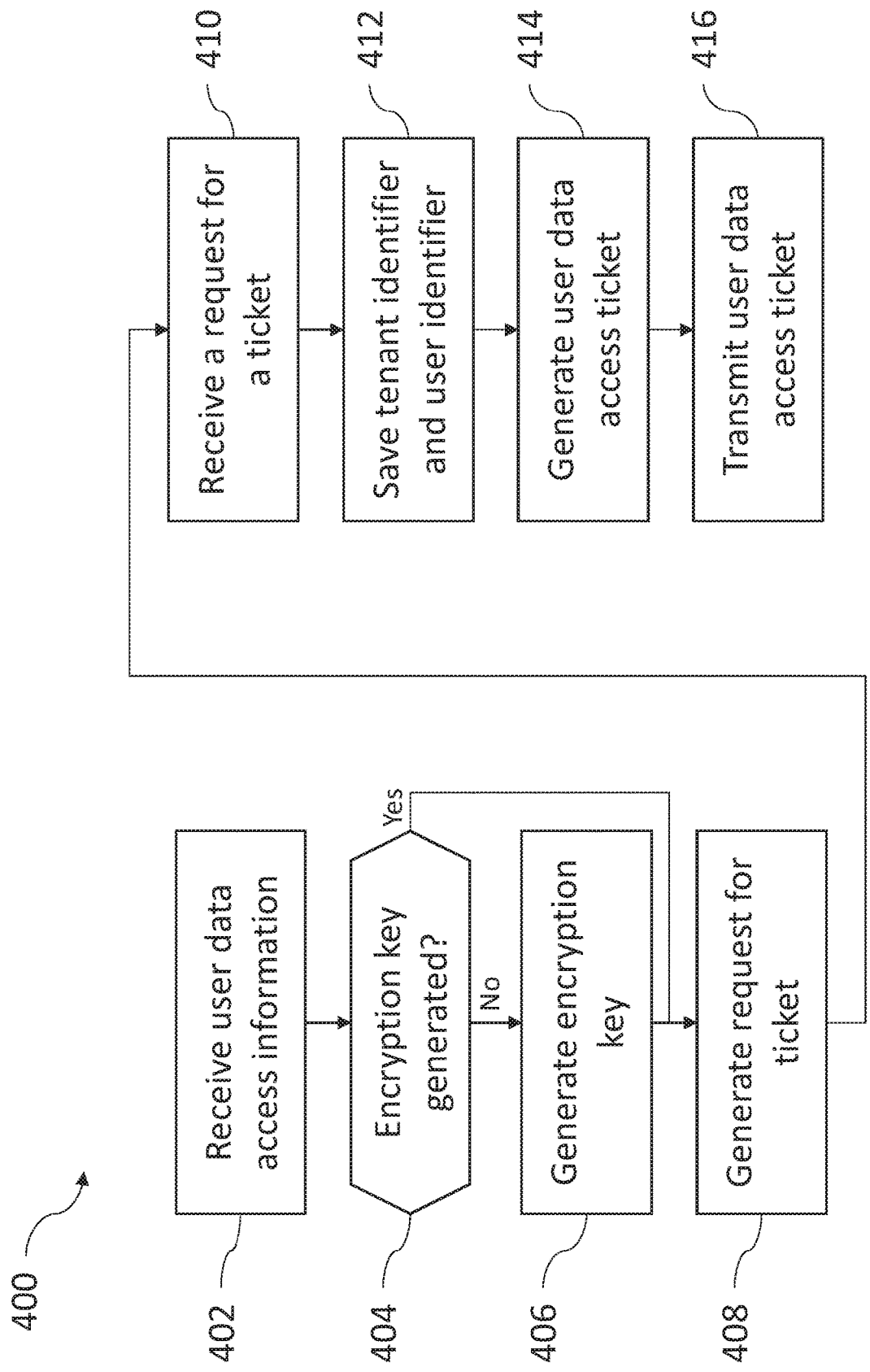
FIG. 4A and FIG. 4B are flowcharts showing a method of providing access to the cloud service.
Figure 4B:
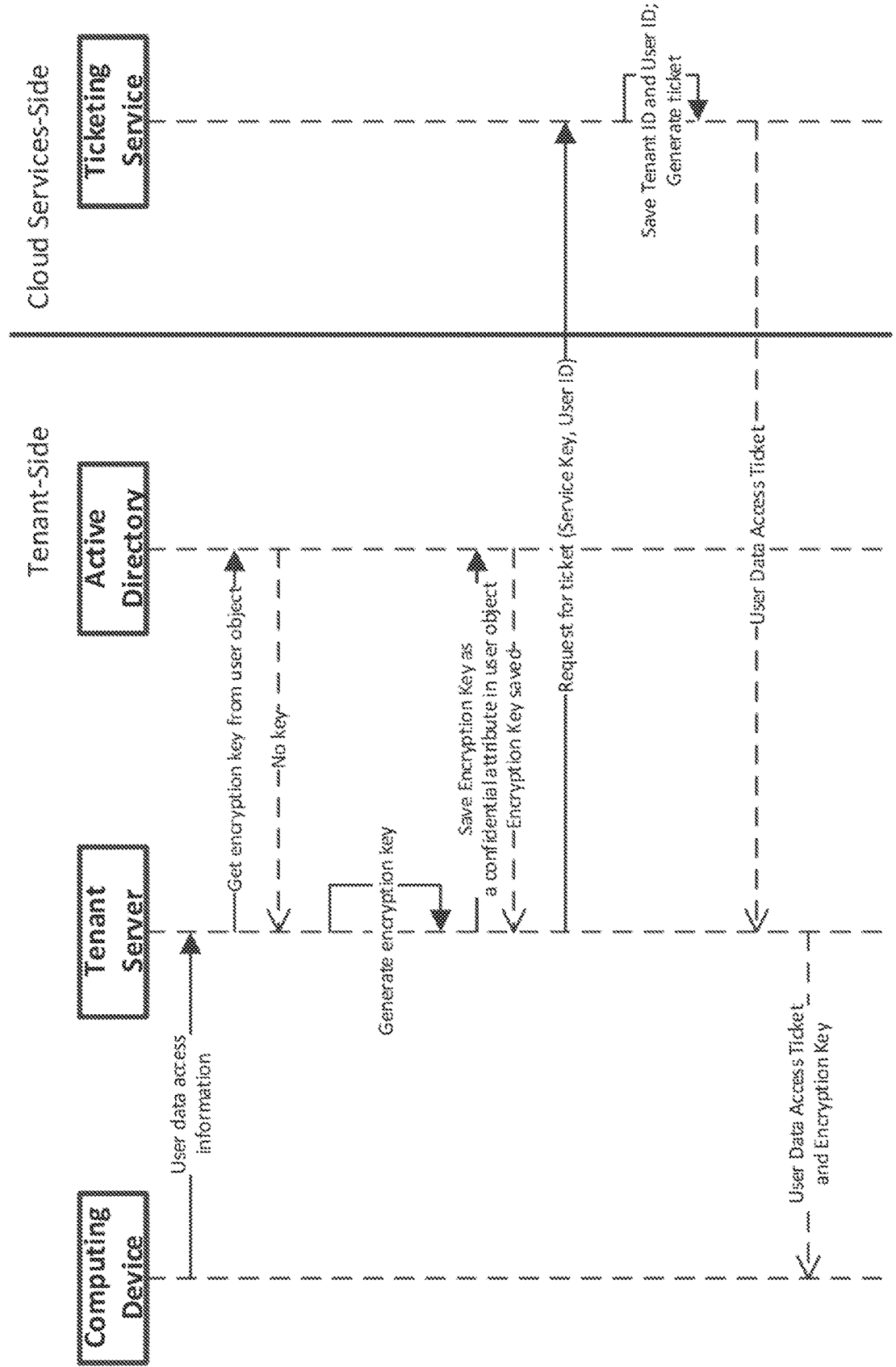

Referring now to FIG. 4A and FIG. 4B, depicted are flowcharts showing a method 400 of providing access to the cloud service. The operations described with reference to FIG. 4A and FIG. 4B may be practiced with the components, elements, devices, and so forth described above. However, it should be understood that the method 400 is not limited to the particular components, elements, devices, etc. Generally speaking, at operation (402), a server of a tenant receives user data access information. At operation (404), the server determines whether an encryption key was generated. Where an encryption key was not generated, at operation (406), the server may generate an encryption key. Where an encryption key was generated, at operation (408) the server may generate a request for a ticket. At operation (410), the cloud service receives a request for a ticket. At operation (412), the cloud service stores the tenant identifier and user identifier. At operation (414), the cloud service generates a user data access ticket. At operation (416), the cloud service transmits the user data access ticket.

At operation (402), a server of a tenant receives user data access information. The server may receive the user data access information from the computing device. The user data access information may be or include a user authorization token, a user ID and passcode, a unique identifier, a PIN, an alphanumeric passcode, and so forth. The user data access information may be used for identifying a user identifier associated with the user operating the computing device.

At operation (404), the server determines whether an encryption key was generated. The server may access an active directory associated with the tenant. The active directory may be maintained by the server. The active directory may include objects which are uniquely associated with users. The objects may be or include a user identifier and an encryption key.

Where an encryption key was not generated, at operation (406), the server may generate an encryption key. The server may generate an encryption key specifically associated with the user. The encryption key may be generated by the server according to an encryption or cryptographic protocol. The encryption/cryptographic protocol may be determined by the server, user operating the computing device, and so forth. In some embodiments, when the server generates the encryption key, the server may save the encryption key associated with the user identifier for the user. The server may save the encryption key in the active directory as a confidential object or attribute.

Where an encryption key was generated, at operation (408) the server may generate a request for a ticket. The server may generate a request for a ticket by providing various information in a ticket request. The ticket request may include, for instance, the service key (e.g., generated in a manner similar to method 300 outlined above with reference to FIG. 3A and FIG. 3B). The ticket request may also include a user identifier. As described in greater detail below, the service key may be used for identifying a tenant identifier and determining the tenant is authorized to access the cloud service, and the user identifier may be used for saving encrypted data (such as user data) by cloud service as described in greater detail below with reference to FIG. 5A and FIG. 5B.

At operation (410), the cloud service receives a request for a ticket. The cloud service may receive the request at the service endpoint corresponding to the cloud service. The request may be the ticket request described above with reference to operation (408). Hence, the request may include the service key and user identifier. In some embodiments, the cloud service may identify the tenant identifier within the service key. The service key may be uniquely associated with the tenant, as described above. Thus, the service key may include a tenant identifier uniquely associated with the tenant. The cloud service may extract the service key and locate, identify, or otherwise determine the tenant identifier within the service key.

At operation (412), the cloud service saves the tenant identifier and user identifier. The cloud service may save the tenant identifier and user identifier to a server, memory, or other storage device associated with the cloud service. The cloud service may save the tenant identifier and user identifier in an index. The index may include a cell or location for a tenant identifier, a cell or location for a user identifier, and a location for data received from a computing device corresponding to the user.

At operation (414), the cloud service generates a user data access ticket. The user data access ticket may be uniquely associated with a particular user. The cloud service may generate the user data access ticket based on the tenant identifier and user identifier. The user data access ticket may include or incorporate data which may be used for identifying the tenant identifier and user identifier. For instance, the user data access ticket may include or incorporate data corresponding to the index described above with reference to operation (412).

At operation (416), the cloud service transmits the user data access ticket. The cloud service may transmit the user data access ticket to the computing device which transmitted the user data access information (e.g., at operation (402)). In some embodiments, the cloud service may transmit the user data access ticket to the tenant (e.g., the server of the tenant). In such embodiments, the server may receive the user data access ticket. The server may generate a packet for the computing device. The packet may include, for instance, the user data access ticket and the encryption key for the user. The packet may include the user data service endpoint. The user operating the computing device may user the encryption key for encrypting user data, and may use the user data access ticket for storing the encrypted user data at cloud services, as described in greater detail below.

Figure 5A:
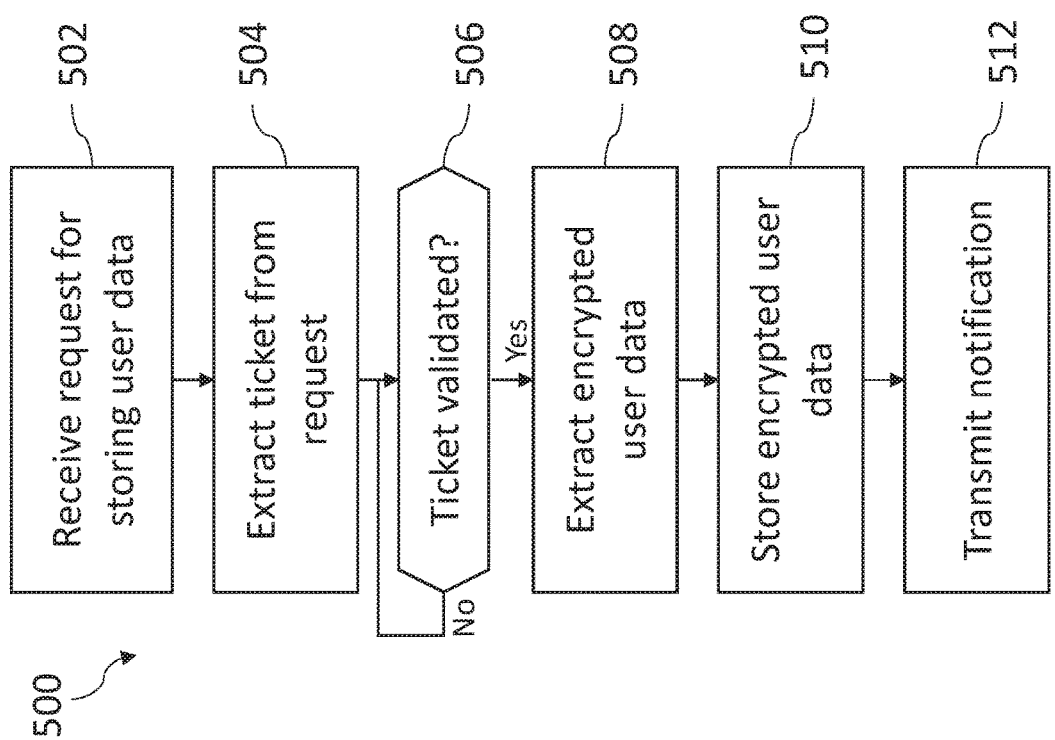
FIG. 5A and FIG. 5B are flowcharts showing a method of storing encrypted user data with the user data service of the cloud service.
Figure 5B:
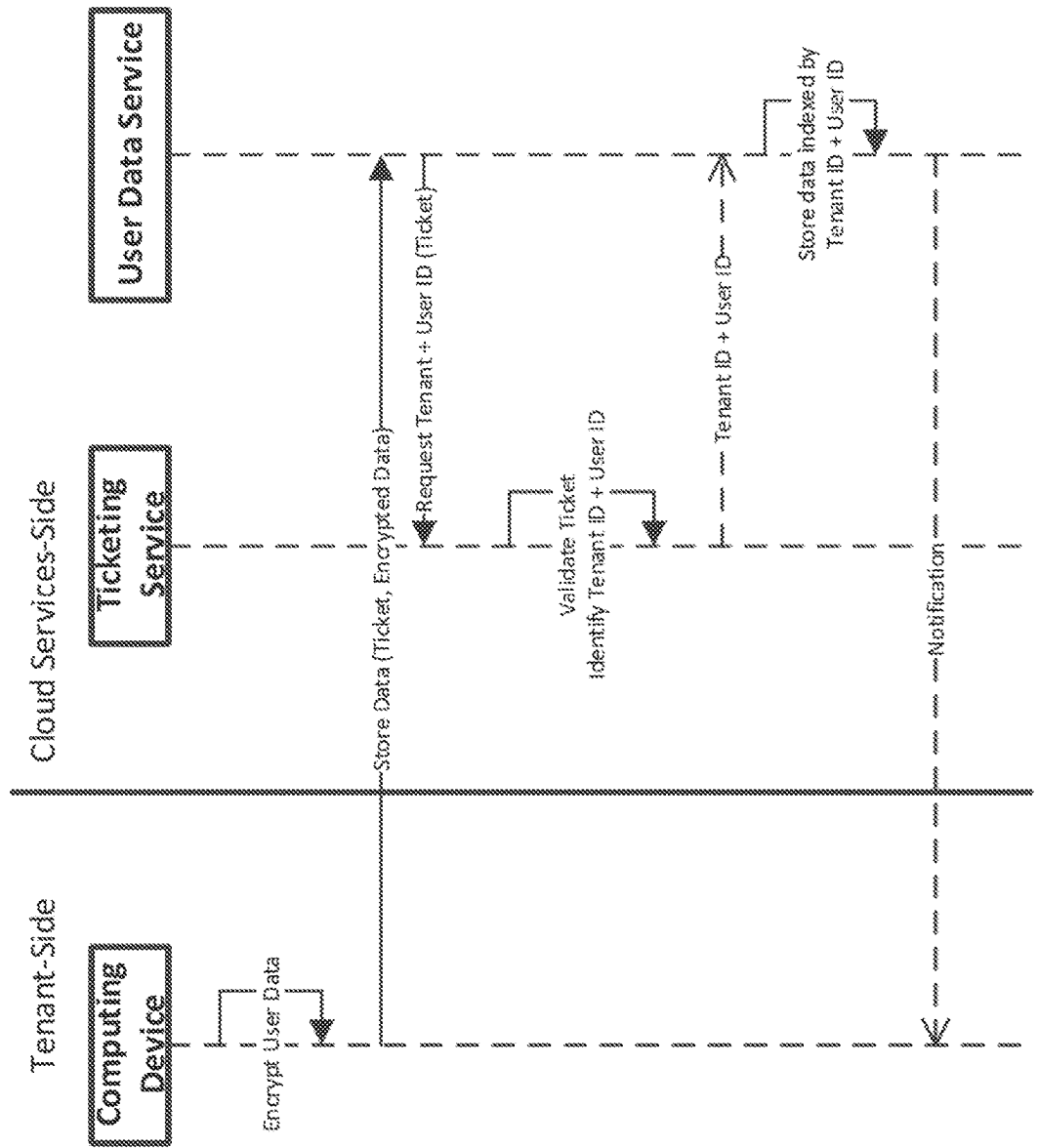

Referring now to FIG. 5A and FIG. 5B, depicted are flowcharts showing a method 500 of storing encrypted user data with the user data service. The operations described with reference to FIG. 5A and FIG. 5B may be practiced with the components, elements, devices, and so forth described above. However, it should be understood that the method 500 is not limited to the particular components, elements, devices, etc. Generally speaking, at operation (502), the cloud service receives a request for storing user data. At operation (504), the cloud service extracts a ticket from the request. At operation (506), the cloud service determines whether the ticket has been validated. The method 500 may loop at operation (506) until the ticket has been validated. Once the ticket has been validated, the method 500 may proceed to operation (508). At operation (508), the cloud service may extract encrypted user data. At operation (510), the cloud service may store the encrypted user data. At operation (512), the cloud service may transmit a notification.

At operation (502), the cloud service receives a request for storing user data. The request may be received from a computing device corresponding to a user. The request may include the user data access ticket corresponding to the user. The user may provide the user data access ticket to the computing device. The request may include encrypted data. In some embodiments, the computing device may encrypt the user data using the encryption key (e.g., received from the server of the tenant as described above in method 400). In some embodiments, the computing device may route the request directly to the cloud service. In some embodiments, the computing device may route the request to the cloud service through the server for the tenant. In either embodiment, the cloud service may receive the request from the computing device corresponding to a particular user.

At operation (504), the cloud service extracts a ticket from the request. The ticket may be a user data access ticket. Hence, the cloud service may extract a user data access ticket which is associated with the particular user from the request from the computing device. The user data access ticket may include information corresponding to the user. The cloud service may validate the user data access ticket, and for identifying the particular user which sent the request.

At operation (506), the cloud service determines whether the ticket has been validated. The method 500 may loop at operation (506) until the ticket has been validated. In some embodiments, when the ticket is not successfully validated, the cloud service may provide an error message to the requester (e.g., the computing device which is operated by the user). The error message may indicate that the ticket is not successfully validated and that access to the cloud service is denied. Once the ticket has been validated, the method 500 may proceed to operation (508). The cloud service may validate the user data access ticket by identifying authentic code or other data in the user data access ticket which validates the authenticity of the user data access ticket. As the cloud service generated the user data access ticket, the cloud service may incorporate such information or data into the user data access ticket. The cloud service may subsequently identify such information or data in the user data access ticket, and the cloud service may validate the user data access ticket based on the presence of such information.

In some embodiments, responsive to validating the ticket, the cloud service may locate, identify, or otherwise look-up the tenant identifier and user identifier associated with the user data access ticket. The cloud service may identify the tenant and user identifier based on the information incorporated into the user data access ticket by the cloud services.

At operation (508), the cloud service may extract encrypted user data. The cloud service may extract the encrypted user data from the request (which contained the encrypted user data). The cloud service may locate the encrypted user data within the request based on the data structure of the encrypted user data. Responsive to locating the encrypted user data, the cloud service may extract the encrypted user data.

At operation (510), the cloud service may store the encrypted user data. The cloud service may store the encrypted user data. The cloud service may store the encrypted user data in a server, memory, or other storage device corresponding to the cloud service. In some embodiments, the cloud service may store the encrypted user data in the index which includes the tenant identifier and user identifier associated with the user data access ticket. The cloud service may subsequently search the index by tenant identifier and user identifier for locating particular encrypted user data.

At operation (512), the cloud service may transmit a notification. The notification may indicate successful saving of the encrypted user data. The cloud service may transmit the notification to the computing device. The notification may be rendered on the computing device for the user associated with the encrypted user data.

Figure 6A:
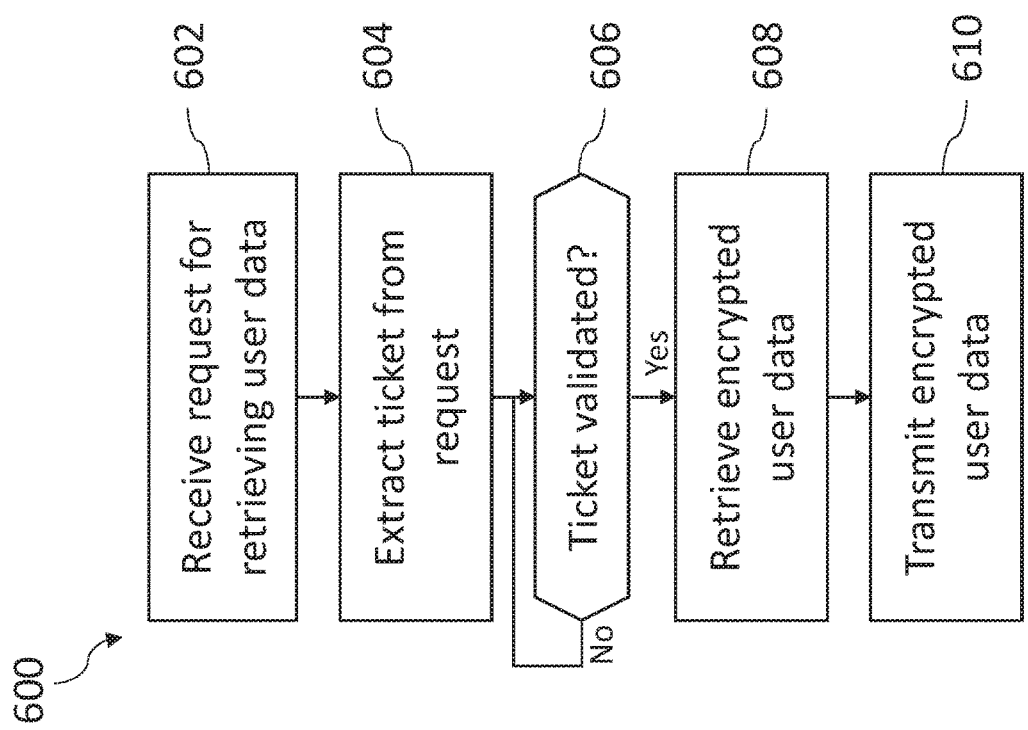
FIG. 6A and FIG. 6B are flowcharts showing a method of retrieving encrypted user data from the user data service of the cloud service.
Figure 6B:
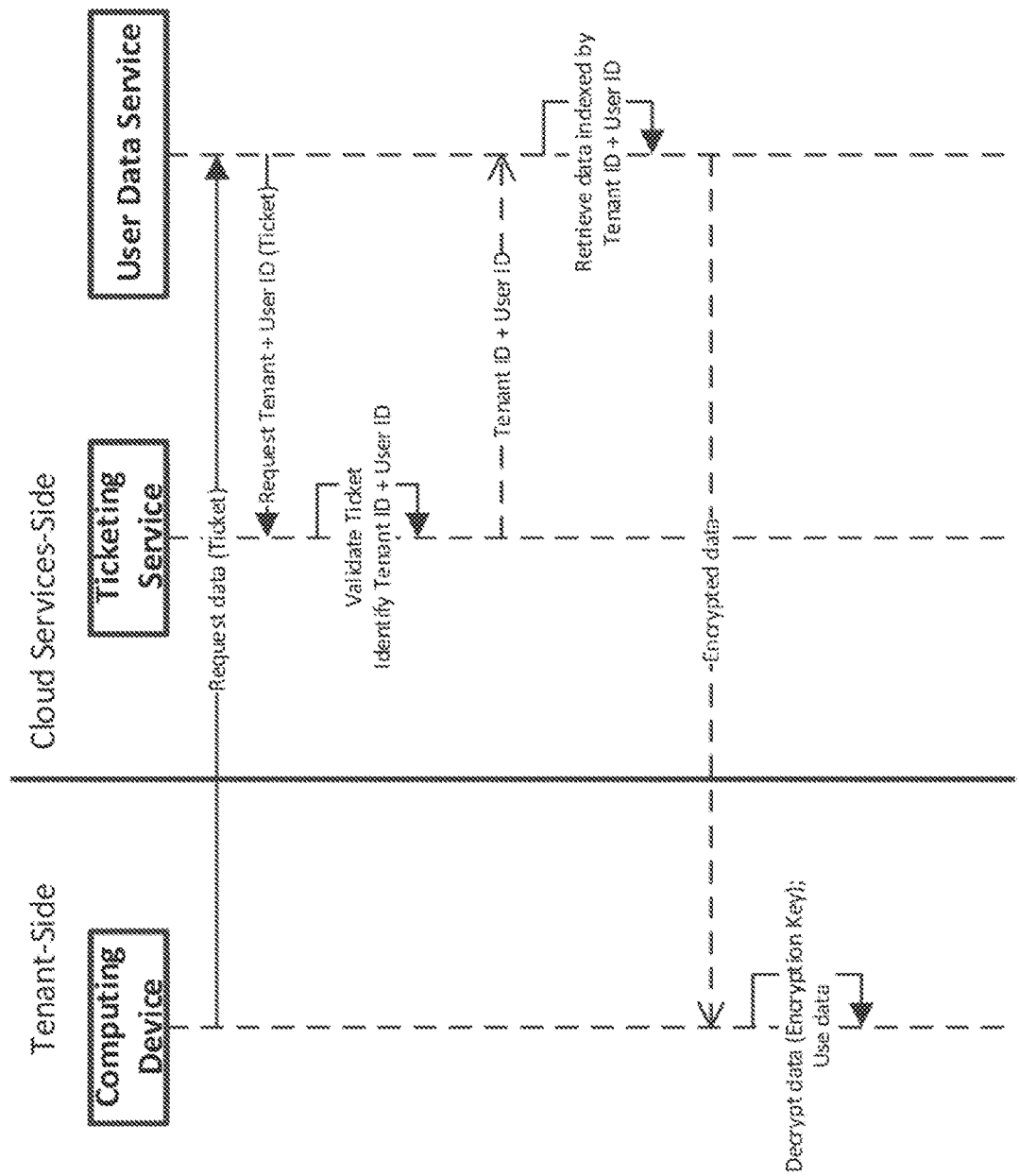

Referring now to FIG. 6A and FIG. 6B, depicted is are flowcharts showing a method 600 of retrieving encrypted user data from the user data service. The operations described with reference to FIG. 6A and FIG. 6B may be practiced with the components, elements, devices, and so forth described above. However, it should be understood that the method 600 is not limited to the particular components, elements, devices, etc. Generally speaking, at operation (602), the cloud service receives a request for retrieving user data. At operation (604), the cloud service extracts a ticket from the request. At operation (606), the cloud service determines whether the ticket has been validated. The method 600 may loop at operation (606) until the ticket has been validated. Once the ticket has been validated, the method 600 may proceed to operation (608). At operation (608), the cloud service may retrieve the encrypted user data. At operation (610), the cloud service may transmit the encrypted user data.

At operations (602)-(606), the cloud service receives a request for retrieving user data, extracts a ticket from the request, and determines whether the ticket has been validated. In some embodiments, when the ticket is not successfully validated, the cloud service may provide an error message to the requester (e.g., the computing device which is operated by the user). The error message may indicate that the ticket is not successfully validated and that access to the cloud service is denied. Operations (602)-(606) may be similar in at least some aspects to operations (502)-(506) of FIG. 5A. However, the request may be a request for retrieving user data from the cloud services and, hence, the request may not include encrypted user data. The request may include the user data access ticket associated with a particular user. The request may be received from a computing device, which may be a different computing device from the computing device which was used for storing the user data. The cloud service may extract the ticket (e.g., the user data access ticket) from the request, and the cloud service may validate the ticket. The cloud service may identify the tenant identifier and user identifier corresponding to the ticket. From operations (602)-(606), the method 600 may proceed to operation (608).

At operation (608), the cloud service may retrieve the encrypted user data. The cloud service may retrieve the encrypted user data using the tenant identifier and user identifier. The cloud service may cross-reference the tenant identifier and user identifier with the index maintained by the cloud service. The index may include tenant identifiers and user identifiers corresponding to particular users, and encrypted user data for the particular users. The cloud service may identify the encrypted user data for the user operating the computing device which transmitted the request received at operation (602). The cloud service may retrieve the identified encrypted user data for the user.

At operation (610), the cloud service may transmit the encrypted user data. The cloud service may transmit the encrypted user data to the computing device which communicated the request received at operation (602). Worth noting, the encrypted user data is maintained in an encrypted state throughout the duration in which the user data is stored at the cloud service. The computing device may receive the encrypted user data, decrypt the encrypted user data (e.g., using the encryption key), and update the data for various tenant resources based on the encrypted user data.

Figure 7:
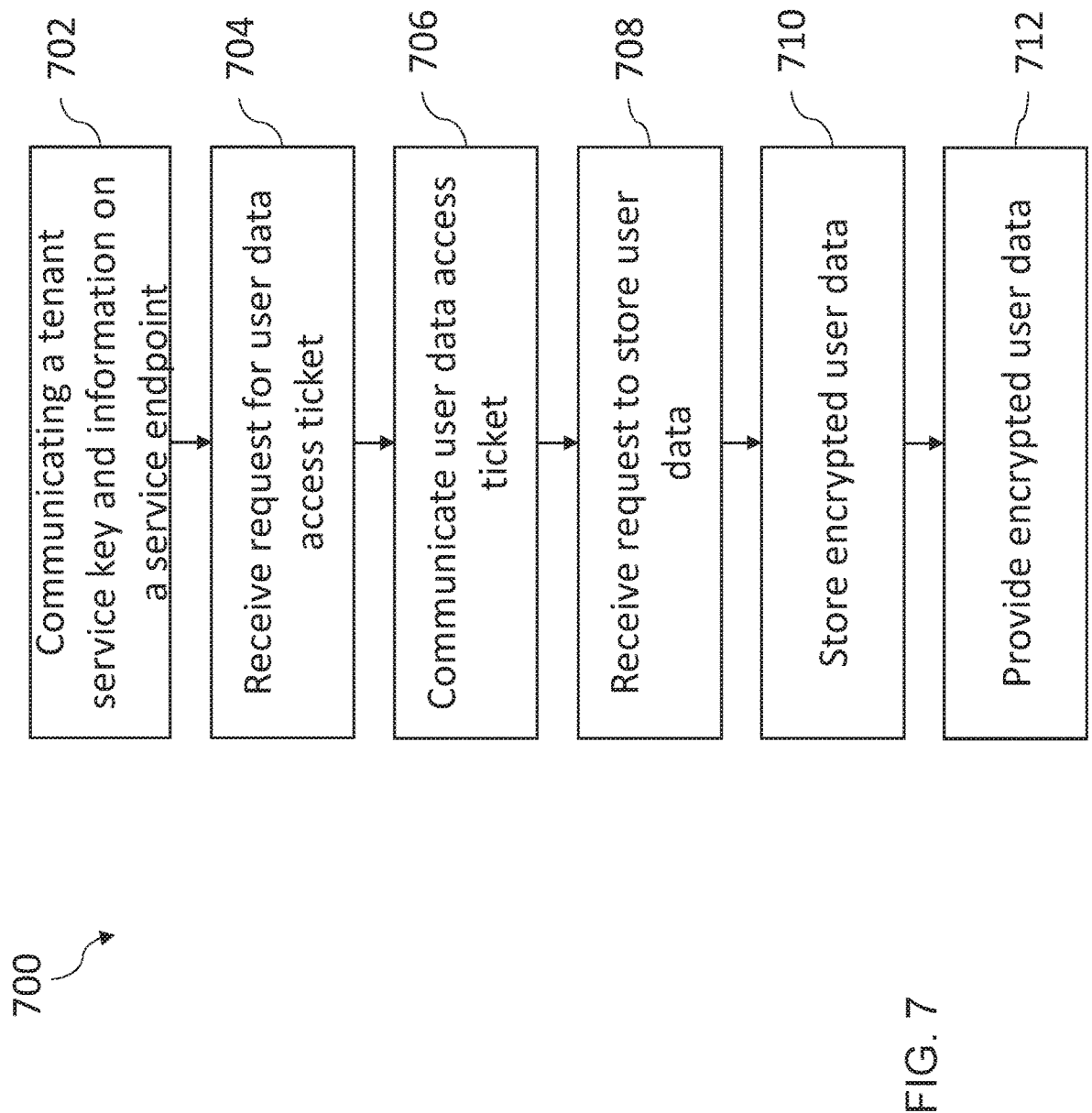
FIG. 7 is a flowchart showing a method for accessing encrypted user data at a multi-tenant hosted cloud service.

Referring now to FIG. 7, depicted is a flowchart showing a method 700 for accessing encrypted user data at a multi-tenant hosted cloud service. The operations described with reference to FIG. 7 may be practiced with the components, elements, devices, and so forth described above. However, it should be understood that the method 700 is not limited to the particular components, elements, devices, etc. Generally speaking, at operation (702), the cloud service communicates a tenant service key and information on a service endpoint. At operation (704), the cloud service receives a request for a user data access ticket. At operation (706), the cloud service communicates the user data access ticket. At operation (708), the cloud service receives a request to store user data. At operation (710), the cloud service stores encrypted user data. At operation (712), the cloud service provides the encrypted user data.

At operation (702), the cloud service communicates a tenant service key and information on a service endpoint. In some embodiments, the cloud service may communicate the tenant service key and information on a service endpoint responsive to enrollment by a tenant of a plurality of tenants. Enrollment may be similar in some respects to the method 300 described above with reference to FIG. 3A and FIG. 3B. The cloud service may communicate the tenant service key and information on the service endpoint to a server of the tenant. The tenant service key may be structured data which is uniquely associated with the tenant. In some embodiments, the tenant service key may include a tenant identifier (or data corresponding to the tenant identifier) associated with the tenant. The information on the service endpoint may be a port of a server, an IP address corresponding to the client service, or other address which may be used for transmitting information to the client service.

In some embodiments, the cloud service may communicate a challenge for enrollment information to a user interface of a device for the tenant. The enrollment information may be or include information which is used by the cloud service to determine whether the tenant is authorized to access the cloud service. The enrollment information may be or include license information, a software registration number, a PIN, unique identifier, alphanumeric code, and so forth. An administrator operating the user interface may provide the enrollment information to the user interface responsive to the device receiving the challenge for enrollment information. The device may communicate the enrollment information back to the cloud service. The cloud service may determine whether the enrollment information is valid. The cloud service may cross-reference the enrollment information with data maintained by the cloud service to determine whether the enrollment information is valid (e.g., the response from the device is successful). The cloud service may enroll the first tenant in the cloud service responsive to a successful response to the challenge for enrollment information by the device.

In some embodiments, the server of the tenant may be a storefront server. A storefront server may be a server configured to provide one or more resources to the corresponding computing devices which are associated with the first tenant. Various examples of resources include, for instance, any type or form of application or service. The application or service may include a network application, a web application, a Software-as-a-Service (SaaS) application, a remote-hosted application, and so on. As some non-limiting examples, an application can include a word processing, spreadsheet or other application from a suite of applications (e.g., Microsoft Office360, or Google docs), an application hosted and executing on a server for remote provisioning to a client, and/or a HTML5-based application. The encrypted user data described herein may identify one or more data of the user for resources provided by the storefront server.

At operation (704), the cloud service receives a request for a user data access ticket. In some embodiments, the cloud service receives the request from the server (e.g., for the first tenant). The cloud service may receive a request for a ticket for a user of the first tenant to access the cloud service. The request may include a user identifier of the user and the tenant service key of the tenant. The request may be similar to the request received at operation (410) of method 400 depicted in FIG. 4A and FIG. 4B and described above. For instance, the request may be generated by a server of a tenant responsive to receiving user data access information. The user data access information may include, for instance, a user identifier for the user corresponding to the computing device. The server of the tenant may generate the request for the user data access ticket responsive to receiving the request.

In some embodiments, the server may generate an encryption key for the user and store the encryption key as a confidential information in a user object for the user. In some embodiments, the server may generate the encryption key prior to transmitting the request for the user data access ticket. The server may determine (e.g., responsive to receiving user data access information) whether an encryption key was previously generated for the user. The server may determine whether an encryption key was previously generated by cross-referencing the user data access information (e.g., user identifier information) with user objects in an active directory. The user objects may include an index of user identifiers and encryption keys. Where an encryption key was not previously generated, a user object corresponding to the user may not be present in the active directory, the user object may include a null value where an encryption key would typically be located, and so forth. Where the server has not previously generated an encryption key, the server may generate an encryption key. The server may generate the encryption key based on a cryptographic protocol, which may be determined by the server or specified by the computing device. In such embodiments, the first server may provide the encryption key and the user data access ticket to the computing device of the user. The encrypted user data may be encrypted (e.g., by the computing device) with the encryption key provided by the first server.

At operation (706), the cloud service communicates the user data access ticket. The cloud service may communicate the user data access ticket to the server of the tenant which requested the ticket. The cloud service may communicate the user data access ticket responsive to receiving the request (e.g., from the server). The user data access ticket may be used by the user to access the user data service. Operation (706) may be similar in at least some aspects to operation (416) of method 400 depicted in FIG. 4A and FIG. 4B and described above. The cloud service may communicate the user data access ticket directly to the computing device. In some embodiments, the cloud service may communicate the user data access ticket to the server of the tenant.

In some embodiments, responsive to receiving the user data access ticket, the server may generate an access packet for the computing device corresponding to the user. The access packet may include, for instance, the user data access ticket and the encryption key for the user. The access packet may include the user data service endpoint (or data corresponding thereto). The computing device may subsequently encrypt user data using the encryption key.

At operation (708), the cloud service receives a request to store user data. In some embodiments, the cloud service may receive a request to store one or more user data of the user from the server of the tenant. In some embodiments, the cloud service may receive the request from the computing device of the user. The second request may include the user data access ticket and encrypted user data of the user. The computing device may generate the request (which is delivered either directly or indirectly to the cloud services) responsive to receiving a save data option selection by a user. The user may select the save data option when, for instance, the user no longer intends on using the computing device, intends on using a different computing device, etc.

In some embodiments, the cloud service may validate the user data access ticket from the request. The cloud service may validate the user data access ticket by identifying characteristic, distinctive, specific, or other unique data within the user data access ticket which is incorporated into the user data access ticket for determining the authenticity of the user data access ticket. The cloud service may identify information corresponding to the user data access ticket. For instance, the cloud service may identify information corresponding to a tenant identifier and a user identifier. The cloud service may index a tenant identifier and user identifier upon generating the user data access ticket. The cloud service may subsequently cross-reference information corresponding to the user data access ticket with the index to determine the corresponding tenant identifier and user identifier.

At operation (710), the cloud service stores encrypted user data. The cloud service may store the encrypted user data responsive to validating the user data access ticket. The cloud service may store the encrypted user data of the user associated with the user identifier and the tenant identifier (e.g., corresponding to the tenant service key). In some embodiments, the cloud service may store the encrypted user data of the user in the index including the tenant identifier (which corresponds to the tenant service key) and the user identifier. The cloud service may store the encrypted user data in a server corresponding to the cloud service, memory, or other storage medium associated with the cloud service. The cloud service may store the encrypted user data without decrypting the encrypted user data. Hence, the user data may only be encrypted and decrypted by a computing device for the user.

At operation (712), the cloud service provides the encrypted user data. The cloud service may provide the encrypted user data to a computing device of the user. The cloud service may provide the encrypted user data to the computing device responsive to validating the user data access ticket received from the computing device of the user. The computing device may decrypt the encrypted user data and identify one or more data of the user for resources provided by one or more servers. In some embodiments, operation (712) may be similar in some aspects to operation (610) of method 600 depicted in FIG. 6A and FIG. 6B and described above.

In some embodiments, the cloud service may receive a request to get one or more user data of the user at the cloud service. The cloud service may receive the request from a computing device (which may be the same as the computing device used for storing the user data, or may be different from the user computing device used for storing the user data) of the user of the first tenant. The request may include the user data access ticket. Hence, each time the user accesses the user data service for storing/retrieving encrypted user data, the user may provide the user data access ticket corresponding to the user. In some embodiments, the cloud service may validate the user data access ticket each time the cloud service receives the user data access ticket. The cloud service may validate the user data access ticket in a manner similar to validation of the user data access ticket described above with reference to operation (710).

In some embodiments, the cloud service may access, determine, or otherwise identify the tenant identifier and the user identifier responsive to validating the user data access ticket. The cloud service may use the tenant identifier and user identifier for generating an index for storing and retrieving the encrypted user data. The cloud service may store the encrypted user data indexed with the tenant identifier and user identifier. The cloud service may subsequently retrieve the encrypted user data using the tenant identifier and user identifier corresponding to the user.

In some embodiments, the cloud service may communicate the encrypted user data to the computing device of the user. The cloud service may access the encrypted user data of the user from storage using the tenant identifier and user identifier. The storage may be indexed to include the tenant identifier corresponding to the tenant and the user identifier associated with the encrypted user data. The cloud service may use the tenant identifier and user identifier to filter the data in storage. The cloud service may retrieve the encrypted user data based on the tenant identifier and user identifier. The cloud service may then transmit the encrypted user data to the computing device of the user.

The computing device of the user may receive the encrypted user data. The computing device may receive the encrypted user data from the cloud service. In some embodiments, the computing device may receive the encrypted user data from the cloud service through the tenant server. Hence, the cloud service may transmit the encrypted user data to the tenant server, and the tenant server may deliver the encrypted user data to the computing device. The tenant server may deliver the encrypted user data to the computing device with the encryption key. The tenant server may identify the encryption key for the encryption key in a manner similar to operation (404) described above with reference to FIG. 4A. In each embodiment, the computing device may receive the encrypted user data and the encryption key. The computing device may decrypt the encrypted user data using the encryption key. The computing device may apply the user data to resources which may be accessed by the user. In this regard, user data for a given user may be applied/used/deployed across different devices which the user may operate within a given enterprise.

Figure 8:
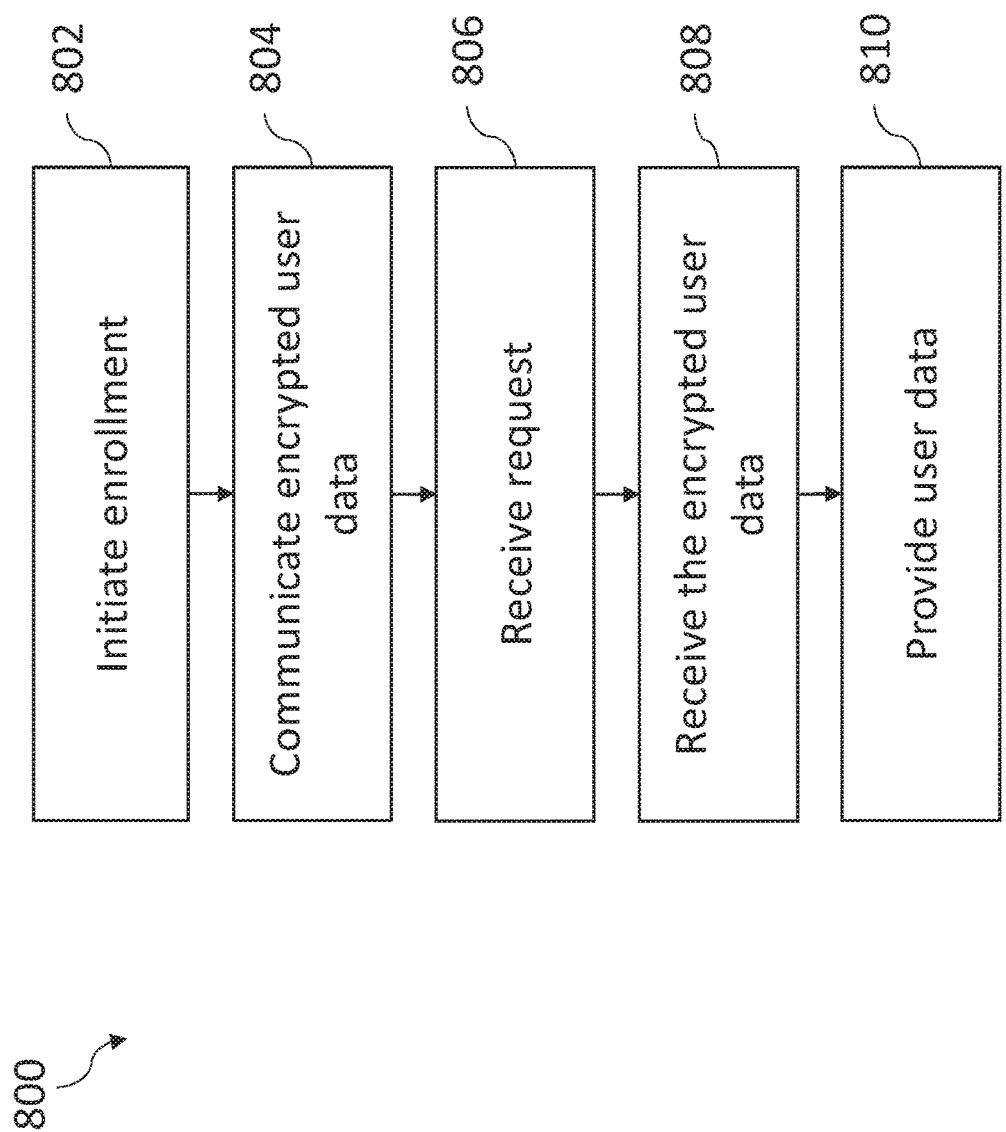
FIG. 8 is a flowchart showing a method for accessing a hosted resource.

Referring now to FIG. 8, depicted is a flowchart showing a method 800 for accessing a hosted resource. The operations described with reference to FIG. 8 may be practiced with the components, elements, devices, and so forth described above. However, it should be understood that the method 800 is not limited to the particular components, elements, devices, etc. Generally speaking, at operation (802), a tenant server initiates enrollment. At operation (804), the tenant server communicates encrypted user data. At operation (806), the tenant server receives a request. At operation (808), the tenant server receives the encrypted user data. At operation (810), the tenant server provides user data.

At operation (802), a tenant server initiates enrollment. In some embodiments, the tenant server may initiate enrollment of the tenant server with a multi-tenant cloud-hosted service. Thus, the tenant server may be one of a plurality of tenant servers enrolled with the multi-tenant cloud-hosted service. The tenant server may initiate enrollment of the tenant server with the multi-tenant cloud-hosted service in a manner similar to the method 300 described above with reference to FIG. 3A and FIG. 3B. For instance, a device (e.g., an administrator device) associated with the tenant may generate a request which is delivered to the tenant server. The tenant server may initiate enrollment by providing the request from the administrator device to the multi-tenant cloud-hosted service. The multi-tenant cloud-hosted service may transmit a challenge for enrollment information to the tenant server. The tenant server may transmit enrollment information (e.g., received from the administrator device) to the multi-tenant cloud-hosted service. The multi-tenant cloud-hosted service may validate the enrollment information and enroll the tenant server with the multi-tenant cloud hosted-service. As described above with reference to FIG. 3A and FIG. 3B, the multi-tenant cloud-hosted service may generate a service key and information corresponding to endpoints, and deliver the service key and information corresponding to the endpoints to the tenant server.

In some embodiments, the tenant server receives a service key and information corresponding to endpoints from the multi-tenant cloud-hosted service. The tenant server may copy, reproduce, replicate, etc. the information corresponding to the endpoints. The tenant server may replicate the information corresponding to the endpoints for each computing device associated with or corresponding to the tenant. Hence, a given tenant may have a plurality of computing devices associated therewith which may be operated by users of the tenant. The tenant server may deliver the information corresponding to the endpoints to each of the computing devices associated with or corresponding to the tenant. The tenant server may maintain the service key (e.g., rather than delivering the service key to the computing device(s)) to maintain the integrity and security of the service key.

At operation (804), the tenant server communicates encrypted user data. In some embodiments, the tenant server communicates encrypted user data to the multi-tenant cloud-hosted service. The encrypted user data may correspond to a user of the first tenant (e.g., a user which is associated with the first tenant). The encrypted user data may include user data for the user corresponding to a hosted resource.

The tenant server may communicate the encrypted user data to the multi-tenant cloud-hosted service responsive to receiving a request for storing the encrypted user data at/by the multi-tenant cloud-hosted service. The user may initiate or otherwise provide the request on a computing device associated with the user. The user may select, generate, modify, etc. one or more user data corresponding to the hosted resource (e.g., on a computing device currently being operated or otherwise used by the user). The user may select an option for storing/saving the one or more user data (e.g., at the multi-tenant cloud-hosted service). The computing device may generate a request for storing the encrypted user data at the multi-tenant cloud-hosted service. The computing device may transmit the request to the tenant server. The request may include the user data (which may or may not be encrypted). Hence, in some embodiments, the computing device may encrypt the user data and the computing device may incorporate the encrypted user data into the request. In some embodiments, the tenant server may encrypt the user data. The request may include a user data access ticket which is uniquely associated with the user. The user data access ticket may be generated in a manner similar to the method 400 described above with reference to FIG. 4A and FIG. 4B.

The multi-tenant cloud-hosted service may receive the request including the user data access ticket and encrypted user data (among other data, in some implementations). validate/authenticate the user data access ticket. The multi-tenant cloud-hosted service may identify the tenant and user associated with the user data access ticket. The multi-tenant cloud-hosted service may store the encrypted user data in a manner in which the encrypted user data is associated with the tenant/user. Such implementations may be similar in at least some aspects to the method 500 described above with reference to FIG. 5A and FIG. 5B.

In some embodiments, the computing device may receive an encryption key from the tenant server. The tenant server may generate and store the encryption key used for encrypting the user data. The tenant server may store the encryption key using a cloud-key vault or other active directory. The tenant server may store the encryption key as a confidential object or attribute in the active directory. In implementations in which the computing device encrypts the user data, the computing device may receive the encryption key from the tenant server, and encrypt the user data using the encryption key.

In some embodiments, the hosted resource is one of a hosted desktop or a hosted application. The hosted resource may execute on-premises (e.g., at the tenant server, at the computing device(s)). The hosted resource may execute remotely (e.g., the hosted resource may be a cloud-based resource which is delivered to the computing devices). Various examples of hosted resources include, for instance, Azure hosted desktop, a network application, a web application, a Software-as-a-Service (SaaS) application, a remote-hosted application, and so on. As some non-limiting examples, an application can include a word processing, spreadsheet or other application from a suite of applications (e.g., Microsoft Office360, or Google docs), an application hosted and executing on a server for remote provisioning to a client, and/or a HTML5-based application.

At operation (806), the tenant server receives a request. In some embodiments, the tenant server may receive a request from a computing device operated by the user to access the hosted resource. The user may control the computing device to select an icon associated with the hosted resource, provide a URL associated with the hosted resource to a browser, and so forth. The computing device may transmit the request to the tenant server. In some instances, the user may operate a first computing device for generating and storing the user data (e.g., at operations (802)-(804)), and the user may subsequently operate a second computing device for requesting access to the hosted resource. For instance, the user may log onto a new computing device and request access to the hosted resource. Responsive to requesting access to the hosted resource on the new computing device, the systems and methods described herein may provide the user data to the new computing device for application to the hosted resource, as described in greater detail below.

The tenant server may provide a request for receiving the encrypted user data to the multi-tenant cloud-hosted service. The tenant server may provide the request to the multi-tenant cloud-hosted service responsive to receiving the request at operation (806). The request provided the multi-tenant cloud-hosted service may include the user data access ticket corresponding to the user. The user may initiate the request on the second computing device (in some embodiments, a different computing device from the device which the user generated and initiated storage of the user data at operations (802)-(804)). The tenant server may provide the request to the multi-tenant cloud-hosted service.

The multi-tenant cloud-hosted service may receive the request from the tenant server. The request received at operation (806) may include the user data access ticket corresponding to the user. The multi-tenant cloud-hosted service may validate/authenticate the user data access ticket and retrieve the encrypted user data corresponding to the user. The multi-tenant cloud-hosted service may transmit the encrypted user data to the tenant server for delivery to the computing device. Such implementations may be similar in some aspects to the method 600 described above with reference to FIG. 6A and FIG. 6B.

At operation (808), the tenant server receives the encrypted user data. In some embodiments, the tenant server may receive the encrypted user data associated with the user from the multi-tenant cloud-hosted service. The tenant server may receive the encrypted user data from the multi-tenant cloud-hosted service following the multi-tenant cloud-hosted service validating the user data access ticket from the request transmitted by the tenant server to the multi-tenant cloud-hosted service at operation (806).

In some embodiments, the tenant server may decrypt the encrypted user data received from the multi-tenant cloud-hosted service. As described above, the tenant server may store the encryption key which is used for encrypting the user data. The tenant server may access the active directory to retrieve the encryption key associated with the user. The tenant server may decrypt the encrypted user data received from the multi-tenant cloud-hosted service using the encryption key associated with the user. In such embodiments, the tenant server (rather than the computing device which transmitted the request received at operation (806)) may decrypt the encrypted user data. In some embodiments, the tenant server may both encrypt and decrypt the user data. In such embodiments, the tenant server may maintain an encryption key associated with the user, and the tenant server may encrypt and decrypt user data stored at the multi-tenant cloud-hosted service.

At operation (810), the tenant server provides user data. In some embodiments, the tenant server provides the user data associated with the user to the computing device operated by the user. The user data may be encrypted user data or decrypted user data (e.g., the user data may be in encrypted or decrypted form). In each embodiment, the user data provided by the tenant server at operation (810) may correspond to the encrypted user data received by the tenant server at operation (808). The computing device which receives the user data may be configured to access the hosted resource with the user data corresponding to the hosted resource based upon the user data. The computing device may be configured to incorporate the user data to the hosted resource. Hence, a user's data for a particular resource (e.g., a hosted application or hosted desktop or other network/computing device resource) may be stored and subsequently applied to or otherwise incorporated into the particular resource by any computing devices subsequently operated or otherwise used by the user.

In some embodiments, the tenant server may provide decrypted user data to the computing device. In such embodiments, the tenant server may decrypt the user data as described above (e.g., using the encryption key associated with the user which is stored by the tenant server in the active directory). The computing device may be configured to access the hosted resource with the user data corresponding to the hosted resource based upon the decrypted user data. The computing device may apply the user data from the decrypted user data to the hosted resource being accessed by the user.

In some embodiments, the tenant server may provide the encrypted user data (e.g., received at operation (808)) to the computing device operated by the user. The tenant server may provide the encryption key to the computing device. The tenant server may provide the encryption key with the encrypted user data (e.g., within the same packet). The tenant server may provide the encryption key separate from the encrypted user data (e.g., in separate packets). In some embodiments, the computing device may be configured to decrypt the encrypted user data using the encryption key. The computing device may be configured to access the hosted resource with the user data used or incorporated to the hosted resource based upon the decrypted user data. The computing device may use or incorporate the user data from the decrypted user data to the hosted resource being accessed by the user.

According to the embodiments described herein, the encrypted user data may be decrypted and delivered to various computing devices of a tenant. Thus, the user data may be encrypted and stored on the multi-tenant cloud-hosted service to provide persistent user data for various resources across multiple computing devices or endpoints. When a user accesses a new computing device or endpoint (which may or may not have previously been accessed by the user), the encrypted user data may be applied to the hosted resources on the new computing device.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for accessing encrypted user data at a multi-tenant hosted cloud service, the method comprising:

communicating, by the cloud service responsive to enrollment by a first tenant of a plurality of tenants, a tenant service key associated with the first tenant to a first server of the first tenant, the first server of the first tenant configured to communicate with a plurality of computing devices associated with respective users of the first tenant, the tenant service key used for granting the respective users of the first tenant access to the cloud service;

receiving, by the cloud service from the first server, a first request for a ticket for a user of the first tenant to access the cloud service, the first request comprising a user identifier of the user and the tenant service key of the first tenant;

communicating, by the cloud service to the first server of the first tenant responsive to determining the tenant service key is included in the first request, a user data access ticket for the first server to transmit to one or more computing devices of the user to permit the user access to the user data service;

receiving, by the cloud service from the one or more computing devices, a second request to store user data of the user, the second request comprising the user data access ticket and encrypted user data of the user;

storing, by the cloud service responsive to validating the user data access ticket included in the second request, the encrypted user data of the user in association with the user identifier and a tenant identifier corresponding to the tenant service key; and providing, by the cloud service, the encrypted user data to the one or more computing devices of the user responsive to validating the user data access ticket included in a third request to the cloud service to retrieve the encrypted user data, the one or more computing devices configured to decrypt the encrypted user data and use the user data of the user.

2. The method of claim 1, further comprising storing, by the cloud service, the encrypted user data of the user in a storage indexed by the user identifier and the tenant identifier.

3. The method of claim 1, further comprising receiving, by the cloud service from the computing device of the user of the first tenant, a third request to retrieve the encrypted user data of the user at the cloud service, the third request comprising the user data access ticket.

4. The method of claim 3, further comprising accessing, by the cloud service responsive to validating the user data access ticket, the tenant identifier and the user identifier.

5. The method of claim 1, wherein providing the encrypted user data to the computing device further comprises:

accessing, by the cloud service, the encrypted user data of the user from storage using the tenant identifier and the user identifier identified based on the user data access ticket; and communicating, by the cloud service, the encrypted user data to the computing device of the user.

6. The method of claim 1, further comprising communicating, by the cloud service, a challenge for enrollment information to a user interface of a device of the first tenant, the cloud service enrolling the first tenant in the cloud service responsive to a successful response to the challenge for enrollment information.

7. The method of claim 1, wherein the first server is configured to generate an encryption key for the user and store the encryption key as a confidential information in a user object for the user.

8. The method of claim 7, wherein the first server is configured to provide a cloud service endpoint, the encryption key and the user data access ticket to the computing device of the user, the computing device configured to access the cloud service by providing encrypted user data and the user data access ticket to the cloud service endpoint received from the first server.

9. The method of claim 8, wherein the encrypted user data is encrypted using the encryption key provided by the first server.

10. The method of claim 1, wherein the first server of the first tenant is a storefront server and the encrypted user data is associated with resources provided by the storefront server.

11. A system for accessing encrypted user data at a multi-tenant hosted cloud service, the system comprising:

the cloud service configured to communicate, responsive to enrollment by a first tenant of a plurality of tenants in the cloud service, a tenant service key associated with the first tenant to a first server of the first tenant, the first server of the first tenant configured to communicate with a plurality of computing devices associated with respective users of the first tenant, the tenant service key used for granting the respective users of the first tenant access to the cloud service;

receive, from the first server, a first request for a ticket for a user of the first tenant to access the cloud service, the first request comprising a user identifier of the user and the tenant service key of the first tenant;

communicate, to the first server of the first tenant responsive to determining that the tenant service key is included in the first request, a user data access ticket for the first server to transmit to one or more computing devices of the user to permit the user access to the user data service;

receive, from the one or more computing devices, a second request to store user data of the user, the second request comprising the user data access ticket and encrypted user data of the user;

store, responsive to validating the user data access ticket included in the second request, the encrypted user data of the user in association with the user identifier and a tenant identifier corresponding to the tenant service key; and provide the encrypted user data to the one or more computing devices of the user responsive to validating the user data access ticket included in a third request to the cloud service to retrieve the encrypted user data, the one or more computing devices configured to decrypt the encrypted user data and use the user data of the user.

12. The system of claim 11, wherein the cloud service is configured to store the encrypted user data of the user in a storage indexed by the user identifier and the tenant identifier.

13. The system of claim 11, wherein the cloud service is configured to receive, from the computing device of the user of the first tenant, a third request to retrieve the encrypted user data of the user at the cloud service, the third request comprising the user data access ticket.

14. The system of claim 13, wherein the cloud service is configured to access, responsive to validating the user data access ticket, the tenant identifier and the user identifier.

15. The system of claim 11, wherein providing the encrypted user data to the computing device further comprises:

accessing the encrypted user data of the user from storage using the tenant identifier and the user identifier identified based on the user data access ticket; and communicating, the encrypted user data of the user to the computing device of the user.

16. The system of claim 11, wherein the cloud service is configured to communicate a challenge for enrollment information to a user interface of a device of the first tenant, the cloud service enrolling the first tenant in the cloud service responsive to a successful response to the challenge for enrollment information.

17. The system of claim 11, wherein the first server is configured to generate an encryption key for the user and store the encryption key as a confidential information in a user object for the user.

18. The system of claim 17, wherein the first server is configured to provide a cloud service endpoint, the encryption key and the user data access ticket to the computing device of the user, the computing device configured to access the cloud service by providing encrypted user data and the user data access ticket to the cloud service endpoint received from the first server.

19. The system of claim 18, wherein the encrypted user data of the user is encrypted using the encryption key provided by the first server.

20. The system of claim 11, wherein the first server of the first tenant is a storefront server and the encrypted user data is associated with resources provided by the storefront server.

21. A method for accessing a hosted resource, the method comprising:
  initiating, by a first tenant server of a first tenant, enrollment of the first tenant server with a multi-tenant cloud-hosted service, the first tenant server of the first tenant configured to communicate with a plurality of computing devices associated with respective users of the first tenant;
  communicating, by the first tenant server to the multi-tenant cloud-hosted service, encrypted user data corresponding to a user of the first tenant received by the first tenant server from one or more computing devices of the user, the encrypted user data including user data for the user corresponding to a hosted resource;
  receiving, by the first tenant server, a request from the one or more computing devices operated by the user to access the hosted resource;
  receiving, by the first tenant server from the multi-tenant cloud-hosted service, the encrypted user data associated with the user; and
  providing, by the first tenant server to the one or more computing devices operated by the user, the user data associated with the user, wherein the one or more computing devices is configured to incorporate the user data into the hosted resource.

22. The method of claim 21, further comprising:
  storing, by the first tenant server, an encryption key used for encrypting the encrypted user data.

23. The method of claim 22, further comprising:
  decrypting, by the first tenant server, the encrypted user data received from the multi-tenant cloud-hosted service, and wherein providing the user data comprises:
    providing, by the first tenant server to the computing device operated by the user, the user data in decrypted form, wherein the computing device is configured to incorporate the decrypted user data into the hosted resource.

24. The method of claim 22, wherein providing the user data comprises:
  providing, by the first tenant server to the computing device operated by the user, the user data in encrypted form and the encryption key, wherein the computing device is configured to decrypt the user data using the encryption key and incorporate the decrypted user data into the hosted resource.

25. The method of claim 21, wherein the hosted resource is one of a hosted desktop or a hosted application.

* * * * *